Oct. 12, 1965  J. J. SHANLEY  3,211,368
METHOD AND APPARATUS FOR TREATING LIQUID MIXTURES
Filed Nov. 5, 1962  7 Sheets-Sheet 1

INVENTOR.
JAMES J. SHANLEY
BY Shanley & O'Neil
ATTORNEY

Oct. 12, 1965  J. J. SHANLEY  3,211,368
METHOD AND APPARATUS FOR TREATING LIQUID MIXTURES
Filed Nov. 5, 1962  7 Sheets-Sheet 2

INVENTOR.
JAMES J. SHANLEY
BY Shanley & O'Neil
ATTORNEY

Oct. 12, 1965 J. J. SHANLEY 3,211,368
METHOD AND APPARATUS FOR TREATING LIQUID MIXTURES
Filed Nov. 5, 1962 7 Sheets-Sheet 3
FIG. 6
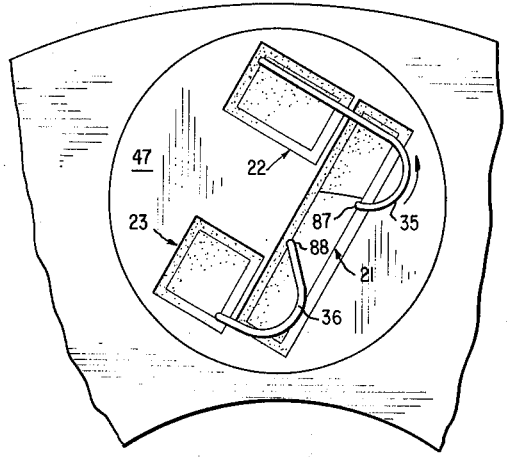
FIG. 7
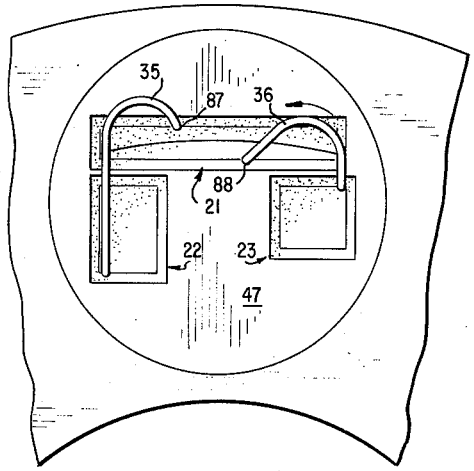
FIG. 5
FIG. 10
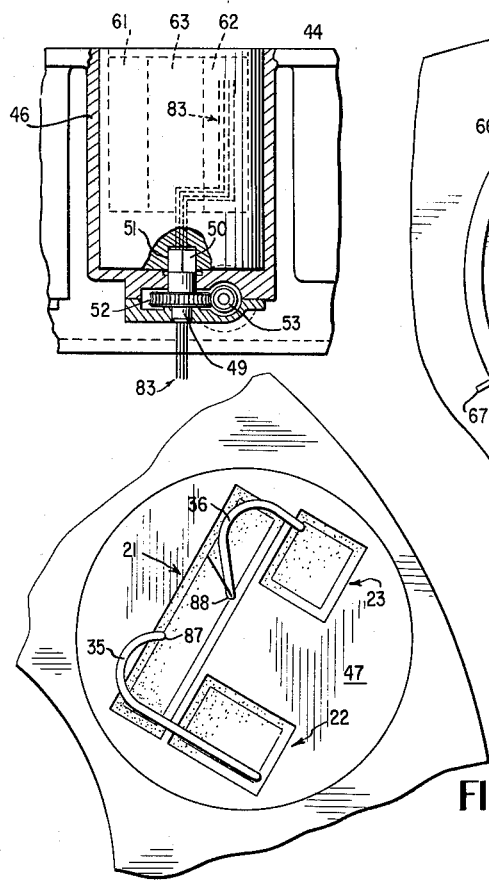
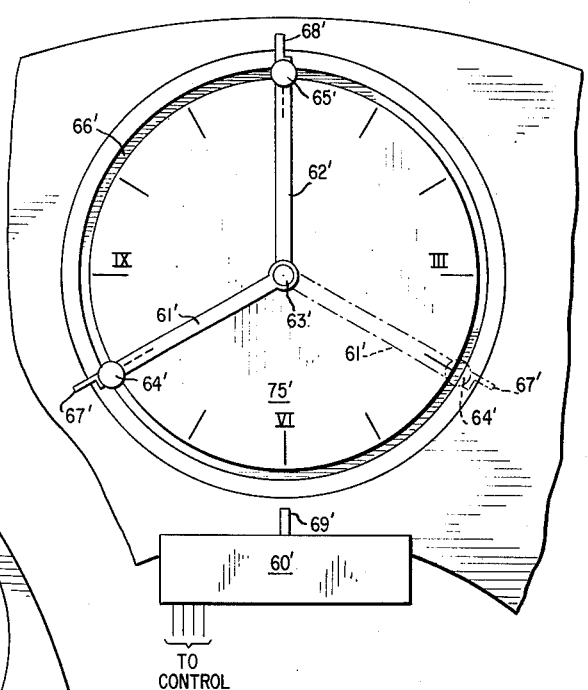
FIG. 8
INVENTOR.
JAMES J. SHANLEY
BY Shanley & O'Neil
ATTORNEY Oct. 12, 1965   J. J. SHANLEY   3,211,368
METHOD AND APPARATUS FOR TREATING LIQUID MIXTURES
Filed Nov. 5, 1962   7 Sheets-Sheet 4

INVENTOR.
JAMES J. SHANLEY
BY Shanley & O'Neil
ATTORNEY

Oct. 12, 1965 J. J. SHANLEY 3,211,368
METHOD AND APPARATUS FOR TREATING LIQUID MIXTURES
Filed Nov. 5, 1962 7 Sheets-Sheet 5

INVENTOR.
JAMES J. SHANLEY
BY Shanley & Oneil
ATTORNEY

Oct. 12, 1965  J. J. SHANLEY  3,211,368
METHOD AND APPARATUS FOR TREATING LIQUID MIXTURES
Filed Nov. 5, 1962  7 Sheets-Sheet 6

INVENTOR.
JAMES J. SHANLEY
BY Shanley & O'neil
ATTORNEY

Oct. 12, 1965        J. J. SHANLEY        3,211,368

METHOD AND APPARATUS FOR TREATING LIQUID MIXTURES

Filed Nov. 5, 1962        7 Sheets-Sheet 7

INVENTOR.
JAMES J. SHANLEY

BY *Shanley & O'Neil*

ATTORNEY

United States Patent Office 3,211,368
Patented Oct. 12, 1965

3,211,368
METHOD AND APPARATUS FOR TREATING LIQUID MIXTURES
James J. Shanely, Bethesda, Md., assignor of one-third to Giovanni Raccuglia, Prospect, Ky., and one-third to David L. Childs, Ann Arbor, Mich.
Filed Nov. 5, 1962, Ser. No. 235,259
31 Claims. (Cl. 233—1)

This patent application is a continuation-in-part of applicant's copending patent application Serial No. 128,484, filed August 1, 1961, now abandoned.

The present invention relates to the centrifugal separation of liquids. More particularly the present invention relates to a new method and system for separating liquids by centrifugation and where desired for treating and storing separated components. Further the present invention involves a new method and system for collecting and centrifuging liquids and for treating and storing separated components. The new system of the present invention utilizes a new machine and new articles of manufacture.

This application is related to copending application Serial No. 802,398, filed March 27, 1959. The discussion of the environment of the invention and the prior art in the copending application is applicable to the present invention.

The invention of the copending application comprises simplified equipment for centrifuging liquid mixtures such as blood in which plural compartment containers are involved. In that system, provision is made for transferring one fraction from a main compartment during centrifuging, while retaining the other fraction in the main compartment. In the prior invention the point at which separated fraction was withdrawn from the main compartment was fixed at the time of manufacture of the equipment. Whether a portion of the light fraction was left in the main compartment in order to obtain pure light fraction or whether a portion of the heavy fraction was transferred with the light fraction to retain only heavy fraction in the main compartment, depended on the amount of liquid mixture placed in the device and the proportions of the fractions and could not otherwise be controlled by the operator.

In the present invention provision is made for withdrawing light fraction with minimal light fraction or no light fraction remaining in the main compartment, or for withdrawing heavy fraction with minimal or no heavy fraction remaining in the main compartment, all by virtue of the design of the equipment and independently of the amount of liquid mixture and the proportions of heavy and light fractions present. In either case, translucent or other radiant energy permeable elements and coacting light or other radiant energy actuated means make this type of separation possible.

Also in this same type of operation, in the case of fractionation of blood, for example, the method and apparatus of the present invention makes it possible to obtain a very tight red cell pack by continued centrifugation after most of the plasma fraction has been transferred out of the main compartment, the plasma fraction continuing to separate from the tightening red cell pack and being continuously or intermittently ejected from the main compartment.

The copending application further provides plural compartment containers of simplified construction in which the heavier formed elements of the liquid mixture must pass through a considerable depth of liquid mixture in arriving at a separated state or in those cases where shallow bodies of liquid mixture are subjected to centrifugal force during centrifuging so as to reduce the distance the formed elements must travel during separation, an extremely large area of interface between the separated fractions necessarily occurs. The first requires long periods of fractionation and the second makes it difficult to segregate the fractions satisfactorily. The present invention on the other hand provides shallow bodies of liquid mixture during the centrifuging steps while presenting a small area of interface between the separated fractions at the time the fractions are segregated thereby making possible a more accurate segregation.

In one variant and embodiment of the present invention this is accomplished by centrifuging a body of liquid mixture to separate and segregate less dense and more dense fractions with the body of liquid mixture being maintained of shallow depth relative to the action of centrifugal force during centrifuging but with the body changed in shape prior to the act of separating and segregating fractions so as to present a relatively small area of interface between the fractions for accurate segregation of the fractions. More specifically, in one embodiment, this is accomplished in articles of manufacture and a system in which the closing and opening of valves is unnecessary during centrifuging and segregation of the fractions.

In another variant and embodiment of the present invention this is accomplished by centrifuging a body of liquid mixture to separate and segregate less dense and more dense fractions with the body of liquid mixture being maintained of shallow depth relative to the action of centrifugal force during centrifuging but with the body of liquid held continuously in such shape that the fraction to be withdrawn after separation can be substantially entirely withdrawn, regardless of its original proportion of the liquid mixture, at a predetermined point before the other fraction arrives at such point.

The invention of the copending application provides simplified equipment for centrifuging liquid mixtures such as blood in which plural compartment containers are involved. The compartments of these containers are connected by passageways and valves are necessary for closing these passageways during the centrifuging and prior to segregation of the separated fractions. One embodiment and variant of the present invention on the other hand contemplates the provision of an apparatus and a method for similar purposes in which no valves are required for closing the passageways during centrifuging.

It is an object of the present invention to provide methods, systems, and articles of manufacture for separating liquid mixtures by centrifuging and segregating the fractions in an economical and efficient manner.

It is an important object of the present invention to provide methods, articles of manufacture and systems for centrifugally separating liquid mixtures into more dense and less dense fractions in which the body of liquid mixture being centrifuged has a shallow depth relative to the forces of centrifugation during centrifuging but at the time of segregation of the fractions presents minimal area of interface between the fractions as the last portion of the fraction being transferred is withdrawn.

A further important object of the present invention is to provide methods, articles of manufacture and systems for centrifugally separating liquid mixtures into more dense and less dense fractions in which optimum segregation is accomplished by means of the different radiant energy transmission characteristics of the fractions to be segregated.

It is a further important object of the present invention to provide methods, systems and articles of manufacture for separating liquid mixtures by centrifuging and segregating the fractions and for treating one segregated fraction with one or more treating liquids, all in a closed and isolated system.

A still further important object of the present invention is to provide methods, systems and articles of manufacture for separating liquid mixtures by centrifuging and segregating the fractions and for treating one segregated fraction with one or more treating liquids in which the mixture of treating liquid and fraction being treated are subjected to centrifugation to remove treating liquid and residual other fraction from the mixture.

Previously there has been no simple and economical equipment for treating a segregated and isolated fraction of a liquid mixture with a treating agent, such as for example in washing the red cell fraction or in treatment of the red cell fraction with glycerol. The present invention provides equipment for carrying out this operation in a simple and efficient manner followed by removing treating agent and undesirable constituents separated from the segregated fraction by the treating agent.

FIGURE 1 is a plan view, with parts broken away to better illustrate the invention, of a centrifuge system in accordance with the present invention;

FIGURE 5 is a view in cross section taken on the line 5—5 of FIGURE 2;

FIGURES 6, 7 and 8 are diagrammatic views showing the parts in different operating positions;

FIGURE 10 is a fragmentary plan view of a further modification of the apparatus of FIGURES 1 to 5 inclusive;

Figure 2:
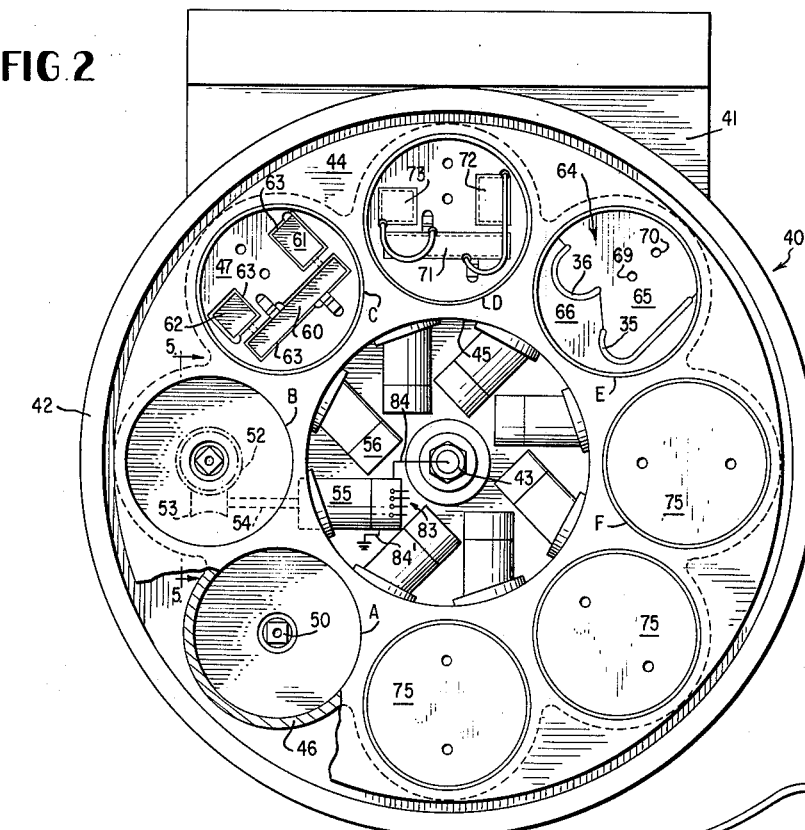
Figure 1:
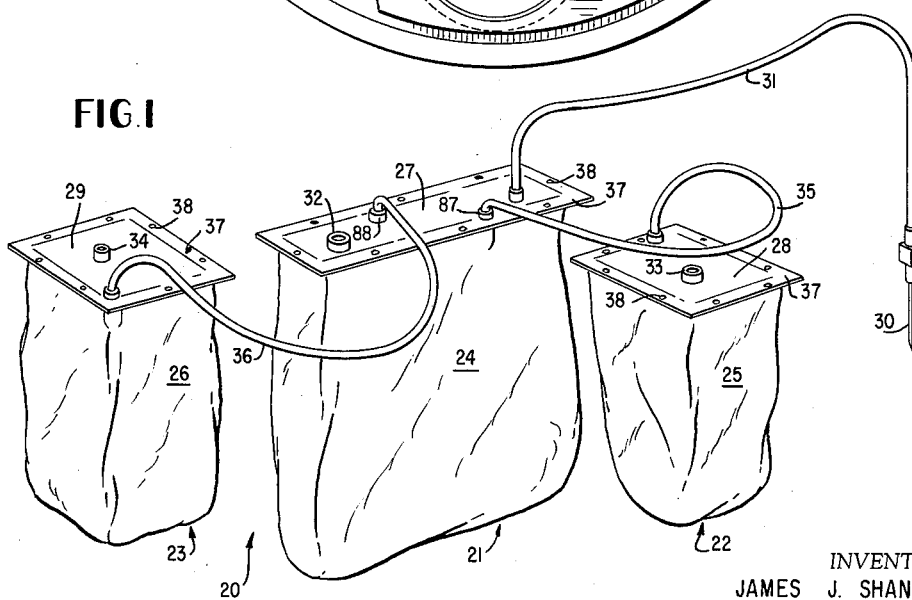
FIGURE 1 is a perspective view of a plural compartment container in accordance with the present invention.

Proceeding with the description of a preferred embodiment of the present invention suitable for handling the fractionation of blood or other liquids, a plural compartment container is indicated generally by reference numeral 20. Each container may be integral or may be made up of a plurality of separate vessels, in either case plural chambers herein termed compartments, are provided. Main compartment 21 is for collecting and initially holding whole blood, compartment 22 for collecting and holding plasma fraction and compartment 23 which initially holds treating liquid. Compartment 23 together with its associated structure may be omitted where its function is not desired.

Container 20 may be of any desired rigidity in construction, the embodiment illustrated having flexible walls 24, 25 and 26, respectively, and top portions 27, 28 and 29, respectively, which may be stiffer. Where the container is to be used in collecting, centrifuging and treating blood, a collecting needle 30 and tube 31 can be supplied integral with vessel 21 in known manner.

Each of the compartments can have a conventional needle penetrable closure 32, 33 and 34, respectively, in an opening in its top for withdrawing liquid from the compartment. Although for purposes of illustration compartments 21 and 22 are shown partially distended for clarity of illustration, these two compartments would be collapsed when empty. Where desired compartment 21 may have a desired anti-coagulant in it initially.

Compartments 21 and 22 are connected by a tubing 35 which places the two compartments in open communication during centrifuging. The passageway through tubing 35 and all other tubing in all modifications disclosed is of small diameter and as a result the amount of liquid present in the tubing at any time is negligible compared to the volume of liquid in the compartments. Where desired a frangible disc (not shown) may initially close tubing 35 adjacent the port 87 formed at its connection with the interior of compartment 21. Compartments 21 and 23 are connected by a flexible tubing 36 which would be initially closed by a frangible disc (not shown) adjacent either compartment. The frangible discs would be rupturable by digital pressure before centrifuging. Tubing 36 connects with the interior of compartment 21 at port 88. At least portions of vessel 21 or tubings 35 and 36 are translucent for purposes to be described. The interior surfaces of compartment 21 are preferably non-wettable by the liquid being centrifuged.

Although all or any one of vessels 21, 22 and 23, or merely compartment tops 27, 28 and 29, could be of rigid construction, when they are flexible, projecting flanges 37 are provided with openings 38 for holding the compartment tops in predetermined positions in the centrifuge, as will be later described.

In the handling of blood, compartment 23 may hold a solution for washing the red cell pack or platelet pack separated in the centrifuging operation or may hold a solution for treating the whole blood or a fraction to solvent extract, absorb or adsorb components or for treating the red cell pack prior to freezing. The entire three-compartment container as thus provided constitutes a novel package.

Referring to FIGURES 2 to 5, inclusive, reference numeral 40 indicates generally a centrifuge which, aside from the structure specifically described herein, is conventional. A representative centrifuge is the SERVALL® RC-3 (Ivan Sorvall, Inc., Norwalk, Conn., catalogue JEF6110). The centrifuge comprises a support structure 41 and a stationary casing 42. Rotor spindle 43 carries a rotor made up of a table portion 44 and a central well portion 45 with the bottom wall of the latter rigidly secured to rotor spindle 43. Arranged around the central well portion 45 of the rotor and equally spaced from the axis of the spindle are a plurality of contiguous smaller wells 46 in table portion 44.

Rotatably mounted in each of wells 46 is a container-holder 47 which is rotatably received within the well and held against vertical movement by lugs 48 carried by the table 44.

Each container-holder 47 is rotatable by means of a shaft 49 having a squared end 50 slidably but snugly received in a centrally disposed square recess 51 in the lower portion of the container-holder. Shaft 49 is rotated by a helically cut pinion gear 52 which in turn is rotated by a helically cut worm gear 53 on a shaft 54. Shaft 54 is driven by an electric motor 55 rigidly mounted in an opening in the sidewall of rotor well 45. The motor casing includes a control box 56.

Each container-holder 47 is made up of a solid body member 57 which can be formed of a light, foam plastic strong enough to withstand the forces encountered in centrifugation but light enough so as not to present objectionable weight problems. If desired body member 57 may have the same specific gravity as water where weight unbalancing during centrifugation would be objectionable. Each body member 57 is encased in a liquid-impervious shell 58 which has formed in it the square recess 51. The exterior surface of shell 58 and the interior surface of peripheral well 46 are such as to minimize friction on relative movement.

Each container-holder 47 has formed in it a plurality of cavities having shapes conforming to those desired for the three vessels of container 20 during centrifuging when they are carrying their maximum liquid content.

Referring to FIGURE 2, it will be noted that six of the peripheral wells in table 44 indicated at A, B, C, D, E and F are for purposes of better illustration shown in various conditions of assembly from empty with parts of the table broken away, as in A, to loaded with a container and with the cover on ready to be centrifuged as at F. Showing C has the container-holder in the well but without the container in place. Showing D has the container in place. Showing E has the container and the tubing positioning inner cover in place.

Referring to showing C of FIGURE 2, the container-holder cavities are indicated at 60, 61 and 62 for receiving vessels 21, 22, and 23, respectively. Each of these recesses has an enlarged upper end which provides a shelf 63 (see also FIGURE 4), carrying pins 74 (see FIGURE 3). Flanges 37 of the vessels 21, 22 and 23 rest on these shoulders with pins 74 received in holes 38, thereby holding in predetermined positions the ports 87 and 88 in these vessels at which tubings 35 and 36, respectively, terminate. A two part inner cover and spacing member (see FIGURE 2, showing E) indicated generally at 64 rests on the top surface of body member 57. This inner lid is made of parts 65 and 66 which cooperate to hold tubings 35 and 36 in predetermined position during centrifuging. A pair of pins 67, 68 anchored in body 57 are snugly received by holes 69 and 70 in portion 65 of the inner lid and fix the inner lid against rotation relative to body 57. On the underside of inner lid portion 65 are spacing members 71, 72 and 73 (see FIGURE 3) having holes which snugly receive the pins 74 carried by shoulders 63. Inner cover 64 and spacer members 72, 73 may be formed of the same material as body 57 but at least parts of spacer 71 for vessel 21 (see FIGURE 4) must be translucent, or better, transparent for purposes to be described.

Outer cover 75 has screw threads on its periphery which coact with screw threads carried by shell 58 to form a screw connection 76 sealed by an O-ring 77. Cover 75 is tightened in place with any suitable tool such as that indicated at 78.

In the container holder 47, adjacent port 87 formed by the connection of tubing 35 with top 27 of vessel 21 is a narrow recess holding an electric lamp 79 and a photoelectric cell 80. A block of transparent material 81 at this point acts as part of the wall of recess 60 to maintain the desired shape of vessel 21. The transparent portion of spacer member 71 has a mirrored surface 82 at an angle which reflects a light beam from light source 79 through the translucent top 27 and sidewall 24 of vessel 21 through block 81 and into photoelectric cell 80, provided the path of light is not blocked by an opaque substance within vessel 21. If preferred the light path may include tubing 35 but for clarity of illustration is shown to one side thereof in FIGURE 3.

Electrical conduits 83 extend through body 57 and out through a passage in shaft 49 to control box 56 (see FIGURE 5). A power conduit 84 goes through a passage in rotor spindle 43 to a conventional slip ring (not shown) conveniently located in the base of the centrifuge. A power source is connected to the slip ring by means of a brush (not shown) and ground 84' on the centrifuge constitutes the other side of the line. Any convenient form of manual switch or conventional timer device (not shown) makes or breaks the connection between the slip ring brush and the power source.

It will be noted that cable 83 is shown with four conductors. The fourth conductor is connected to one side of a duplicate photoelectric cell 85 positioned on the opposite side of recess 60 from cell 80, contiguous to port 88 formed by the connection of tubing 36 with compartment 21. At this latter point there is also a duplicate light source 86 corresponding to light source 79 and a duplicate mirrored surface (not shown) corresponding to surface 82. The two power lines connected to light source 79 are extended to light source 86, the common line serving the power circuit and both the photoelectric cells in known manner. The electric connections and the control devices in control boxes 56 form no part of the present invention but can be of any desired conventional form suitable for carrying out the functions described below.

The operation of the modification illustrated in FIGURES 1–8 and the variant of the method illustrated thereby will now be described.

The container 20 with treating liquid in vessel or compartment 23 and with vessels or compartments 21 and 22 collapsed is presented for use in the collection of blood from a donor. Compartment 21 can have anticoagulant in it and all three vessels may if desired have a small amount of sterile and pyrogen-free non-toxic gas in them to facilitate handling of the liquids. Some suitable apparatus would hold the container 20 components in position for receiving the blood. Where the ports formed by the connections of tubings 35 and 36 with compartments 22 and 23 have frangible discs closing them, only vessel 21 need be held in an upright and supported position. Blood is drawn from the donor through needle 30 and tubing 31 by gravity or where desired by means of vacuum applied to the external walls 24 of vessel 21.

With the usual amount of blood withdrawn from the donor, compartment 21 has such volume that when vessel 21 is placed in cavity 60, the cavity is substantially filled by vessel 21 and the walls 24 of vessel 21 are in contact with the walls of cavity 60. However, this system will work satisfactorily if cavity 60 and compartment 21 have a slightly greater capacity than the normal amount of blood, 500 cc. (plus anticoagulant) taken from the donor. The capacity of plasma compartment 22 is sufficient to accommodate the largest plasma fraction separable from any acceptable blood donation and cavity 61 is large enough to hold vessel 22 thus filled. Compartment 23 is designed large enough to hold sufficient treating liquid, whether it be washing liquid, component solvent, adsorbent, absorbent or antifreeze solution for treating the fraction remaining in compartment 21 after fractionation and segregation of a fraction there.

The container 20 with the whole blood to be fractionated in compartment 21 is placed in one of the container-holders 47 of the centrifuge with the other compartments in their proper cavities. The frangible discs closing the ports in compartments 22 and 23 are crushed. If desired, water or other cushioning liquid is added to the container-holder to fill any portion of the cavities not fully occupied by compartments 21, 22 and 23. Any desired number of bleeder passages, such as those shown at 90, permit the water to move from one cavity to another to accommodate flow of the blood fractions under the influence of centrifugal force. Where other than blood is being handled, a cushioning liquid lighter or heavier than water may be needed. In this as in the other modifications the complementary shape of the cavities and the vessels held in them may obviate the need of cushioning liquid where the vessel walls are strong.

With flanges 37 resting on shoulders 63, the inner cover 64 is put in place with the two parts thereof 65 and 66 holding the tubings 35 and 36 in the positions illustrated and the pins 74 holding the compartment flanges 37 in position. Outer cover 75 is then screwed into place with tool 78 so as to compress O-gasket 77 and seal the container-holder against loss of water. Of course where cushioning liquid is deemed unnecessary container-holder 47 need not be sealed but the equivalent of outer cover 75 will be necessary to hold the parts in position against the heavy forces encountered during centrifugation.

Each container-holder 47 receives a container 20 or the number of containers 20 are such that they can be arranged in balanced relation in the centrifuge. The cushioning liquid added to each cavity is made to be such as to balance the centrifuge to within its tolerances in this respect or where not used the centrifuge is balanced in any desired manner. The container-holders 47 are all in the position shown in FIGURE 3 when centrifuging is initiated. The switch in power line 84 is open. After the centrifuging has progressed for a suitable time period such as to obtain the degree of separation of fractions desired, the switch in circuit 84 is closed by the timer or manually. Through the action of the control devices in control box 56, power is applied to each motor 55 in such a manner that all the container-holders 47 are slowly rotated in a counterclockwise direction around the axis of shafts 49. The speed of rotation is such that the separation of fractions obtained by centrifugal force is not disturbed despite the changing shape of the bodies of separated fractions and, as will be evidenced from FIGURE 3, transfer of the lighter fraction from compartment 21 to compartment 22 is initiated.

This initial application of power to control box 56 energizes both light sources 79 and 86 but only photoelectric cell 80 is connected in controlling relationship with control box 56. This relationship is such that so long as a predetermined amount of light from source 79 is received by photoelectric cell 80, power is continued to be supplied to motors 55 and counterclockwise rotation of the container-holders continues. By adjustment of the photoelectric cell 80 circuitry in control box 56 either appearance of the buffy layer or appearance of the red cell pack in the path of the light beam will actuate control box 56 to stop motor 55. If preferred the position of the light beam and photoelectric cell may be used to determine at which point the motor is stopped. Of course in such case the setting is permanently fixed. At this point of operation, the container-holder is in the position shown in FIGURE 6. Control box 56 operates in such a way that power is cut-off from motor 55, photoelectric cell 80 is disconnected and the control box circuit is set so that opening and closing power line 84 will again start motor 55 but in the reverse direction.

Dimming of a squealer light in power circuit 84 will alert the operator when all motors 55 have stopped and the machine is ready for the second phase of operation. With this setup only one power circuit is needed for all control boxes. When the operator then opens and closes power circuit 84, control boxes 56 apply the power to the motors 55 so as to turn the container-holder 47 rapidly in a clockwise direction. When the container-holder 47 reaches the position shown in FIGURE 7 limit switch 92 is operated by post 93 coming into engagement with switch arm 94. Switch 92 acting through control box 56 stops motor 55 and resets the controls in control box 56 in the same manner as the photoelectric cell 80 had previously done. Circuit 84 must be opened and then closed again to start motor 55 in the opposite direction, i.e. counterclockwise. If preferred, control box 56 can have a motor revolution counter and associated controls which will stop the motor when the container-holder 47 reaches the position shown in FIGURE 7. In either case by the time this point has been reached the treating solution in compartment 23 has been or is being transferred to compartment 21. It is to be noted that during this movement of container-holder 47, since port 88 will be located in the red cell pack for a brief period when compartment 23 is on the far side of port 88 relative to the axis of revolution, some heavier fraction may enter tubing 36 and find its way into compartment 23. This is not objectionable since the treating solution is immediately thereafter mixed with the heavier fraction and the amount of heavier fraction transferred is very small because of the small caliber of the passageway through tubing 36 and because of the relatively brief time this transfer can occur. Further, when the container-holder is in the position shown in FIGURE 7, heavier fraction will leave through port 87 and enter tubing 35. However, this heavier fraction cannot reach compartment 22 during the preceding movement nor in this position, and later movement of container-holder 47, to be described, empties the passageway of tubing 35.

Throughout the present invention the presence of a small amount of gas in the system will prevent any tendency toward siphoning of liquid; however, the centrifugal forces present will in themselves, normally be great enough to prevent siphoning with temporary collapse of tubing taking place.

With the container-holder 47 in the position shown in FIGURE 7, the operator of the centrifuge cuts down the speed of revolution of the rotor and then accelerates and decelerates the rotor to bring about a thorough intermixing of the treating solution and the heavier fraction or the centrifuge can be stopped and oscillated for this purpose.

After a time period necessary for this treatment, the operator again starts or accelerates the centrifuge and brings it up to speed, but with the container-holder 47 in the position shown in FIGURE 7 to obtain a desired separation of treating solution fraction and heavier blood fraction. The lighter treating solution fraction will be closer to the axis of revolution and will include within it constituents of the heavier fraction which are to be removed in the treating solution and those which are sufficiently lighter than the heavier fraction.

At this time power is again applied to control box 56 to energize photoelectric cell 85 and to start motor 55 to rotate container-holders 47 in a counterclockwise direction. When each container-holder 47 has reached the position shown in FIGURE 8 the separated treating solution and substances carried thereby have been transferred to compartment 23. As in the case of the action of photoelectric cell 80, photoelectric cell 85 stops motor 55 when the light beam from the light source 86 has been interrupted by movement of the red cell pack across its path.

At this point in the operation of the system the operating cycle is completed and the operator can shut off the centrifuge.

It will be noted that the positions of ports 87 and 88 are somewhat critical. Port 87 is at a distance from the associated end of top 27 such that with the least possible proportion of red cells in the blood and the container-holder 47 approaching and passing counterclockwise the position shown in FIGURE 6, the red cell pack will reach the port just before the area of the interface between the red cell fraction and the plasma fraction come into a position at a right angle to the long dimension of the top 27. On the other hand the port 88 is at a distance from its associated end of top 27 such that with the greatest possible proportion of red cells in the blood and the container-holder approaching clockwise the position shown in FIGURE 8, the red cell pack will reach the port just after the area of the interface between the red cell fraction and the plasma fraction pass a position at a right angle to the long dimension of top 27.

It will be noted that some container-holders 47 will rotate farther than others because of the difference in proportions of the red cell and plasma fractions. So that this will not cause objectionable unbalancing of the centrifuge rotor, the container-holders can be balanced, or counterbalanced, so that the center of gravity of each one falls on its axis of rotation with the vessels in cavities 60, 61, 62, and all full of a liquid having a specific gravity equal to that of whole blood. In such case the only unbalancing factors are those due to the slight differences of the specific gravities of the fractions and the water or cushioning liquid.

Figure 9:
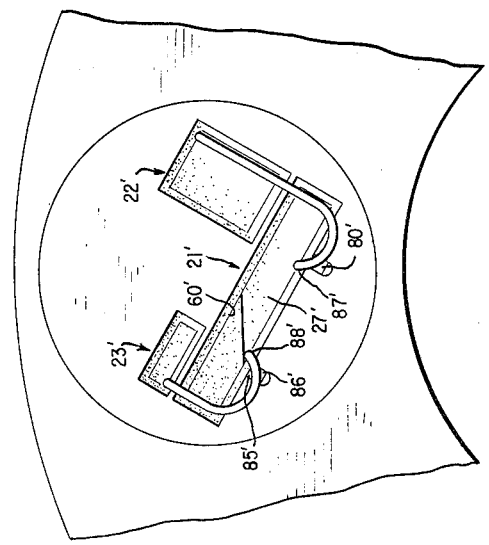
FIGURE 9 is a diagrammatic plan view of a modification of the apparatus of FIGURES 1–5 inclusive.

FIGURE 9 shows a slight modification of compartment top 27 and the container-holder 47 for use in the same type of system as that of FIGURES 1–5 inclusive. In describing this modification the same reference numerals but primed will be used to designate the elements corresponding to those in the preceding modification. A port 88' is positioned on the same side of a top 27' of a compartment 21' as a port 87' and about the same distance from the associated end of this compartment as port 87' is from the other end. At the same time a photoelectric cell 85' and a light source 86' and associated structure are positioned on the same side of the cavity 60' as a photoelectric cell 80'. In this modification photoelectric cell 80' is positioned so that a layer of predetermined thickness of plasma fraction remains in compartment 21' when the red cell pack interrupts the light beam and actuates control box 56 to stop motor 55. This layer of plasma fraction will be designed to be platelet rich and include the buffy layer. Further in this modification, a compartment 23' can be much smaller than compartment 23 and will be empty or may have only a substance in it suitable for mixing with the platelet rich fraction. The shape of vessel 23' and its associated cavity will present a shallow body of platelet rich fraction and may be similar to and be arranged parallel to main compartment 21' and its associated cavity.

In this modification when a portion of the plasma fraction has been transferred to compartment 22' and the photoelectric cell has stopped motor 55 and permitted the operator to reverse the motor, the movement is again slow so as not to disturb the separation of the red cell fraction and the lighter fraction still remaining in the main compartment. By the time clockwise movement of container 47' has brought it into the position shown in FIGURE 9 transfer of platelet rich plasma, and if desired buffy layer, is taking place. In the meantime, when the operator re-started motor 55, photoelectric cell 85' was connected in circuit and photoelectric cell 80' disconnected. Port 87' and its associated photoelectric cell 85' are so located relative to one another that nearly all the platelet rich plasma, and if desired buffy layer, are transferred before movement of the red cell fraction into the path of the beam of light from source 86' stops motor 55. The operator can reverse motor 55 at this point and by means of a revolution counter stop the container-holder in the position corresponding to that illustrated in FIGURE 3 of the earlier described modification. In this position centrifuging is continued at the same or higher speed to move the platelets through the shallow body of liquid and thereby deposit a platelet pack on the wall of compartment 23'. The centrifuge is then stopped and the four fractions are segregated in vessels 21', 22', and 23', the platelet pack being recoverable by drawing off the plasma from compartment 23'.

A refinement of the operation of this modification can be realized by positioning photoelectric cell 80' closer to port 87' and having two settings on the sensitivity of this cell, each setting consecutively brought into operative relation by control box 56. In the first setting, as the container-holder moves into the position corresponding to that of FIGURE 6 of the preceding modification, the movement of the buffy layer into the beam of light actuates the control box to stop motor 55 while a layer of platelet rich plasma and the buffy layer still remain in compartment 21'. For the next step photoelectric cell 85' is positioned relative to port 91' so that only the platelet rich fraction is transferred to compartment 23' and control box 56 then actuates to stop motor 55. Following each step the operator starts the motor. When the container-holder again gets to a position such as that illustrated in FIGURE 6 of the preceding modification, the second setting of the photoelectric cell does not stop the motor until red cell fraction has cut-off all the light beam and a major portion of the buffy layer is transferred to plasma compartment 22'. In this way a platelet rich fraction of plasma and a red cell pack are achieved.

In a still further modification of the arrangement of FIGURE 9, by obvious adjustments and steps, the platelet rich fraction can be transferred to plasma compartment 22' at the time the remainder of the plasma is initially transferred, and the buffy layer alone can be transferred to compartment 23.

It will be understood that by obvious variations the modifications thus far described can be used to separate more than two liquid fractions of respectively differing densities, either by position of the photoelectric cells relative to the ports or by difference in the light transmitting characteristics of the several fractions. In any event, platelets can be separated in the form of a pack either on the wall of compartment 22' or on the wall of compartment 23' depending upon the mode of platelet rich plasma segregation.

FIGURE 10 is a further modification of the system disclosed in FIGURES 1–5 inclusive in which the top of each of container-holders 47 is modified to conform to that shown in FIGURE 10 with the structure of FIGURES 1–5 inclusive remaining unchanged except as noted hereunder. The primed reference numerals are used to designate new elements. The purpose of this modification is to simplify the system where accuracy in segregation of the separated fractions is not of primary importance. The photoelectric cells and light sources can be eliminated and each control box 56 is actuated through the medium of a simple switch box 60' and two tripping arms 61' and 62' which are independently pivoted at 63' in the center of a cover 75'. Setscrews 64' and 65' coact with a peripheral groove 66' in the top surface of cover 75' to make it possible to anchor each lever arm independently at a predetermined angular position. Each arm 61, 62 has a projecting lug 67', 68' respectively, for contacting and moving switch arm 69'. The upper face of cover 75' has been marked in the drawing to simulate a clock face in order to simplify the description.

Figure 3:
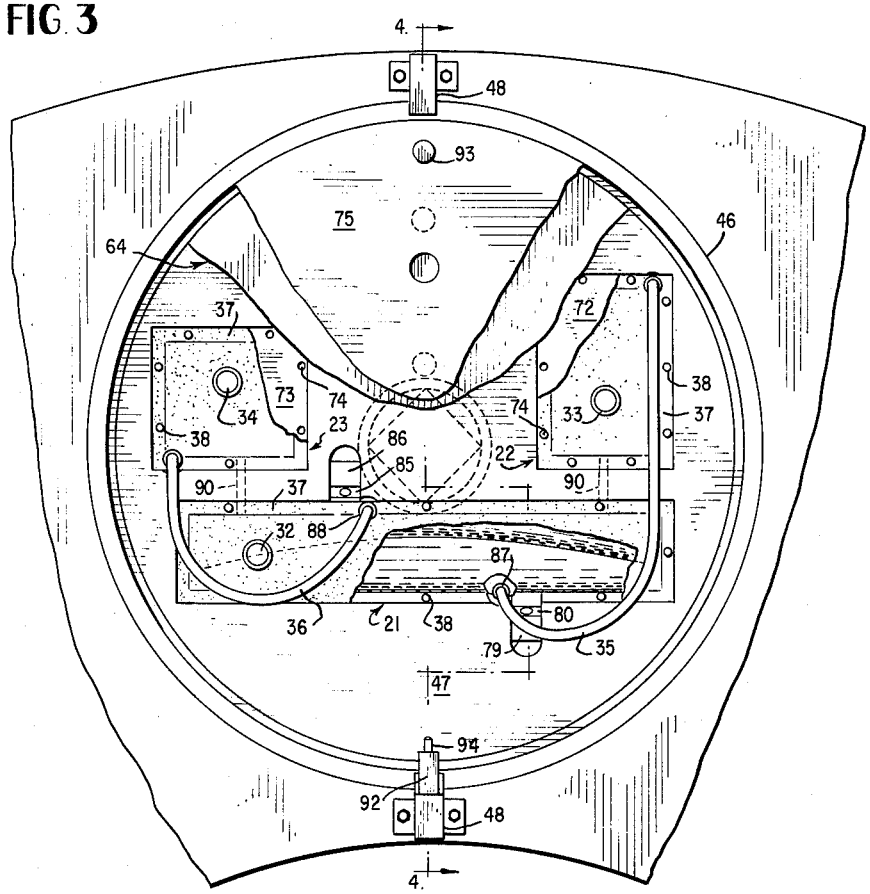
FIGURE 3 is an enlarged fragmentary plan view of a portion of FIGURE 2 with parts broken away to better illustrate the invention.
Figure 4:
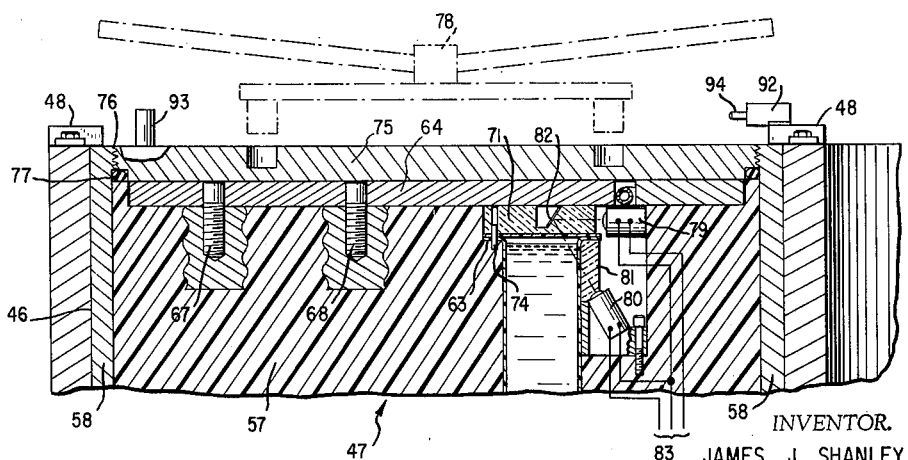
FIGURE 4 is a view in cross section taken on the line 4—4 of FIGURE 3.

With the container-holder 47 in the position shown in FIGURE 3, the clock face of cover 75' is in the position shown in FIGURE 10. The blood donation held in main compartment 21 has been sampled in known manner to determine the proportions of red cells and plasma. With this information arm 61' is set in a predetermined position, in FIGURE 10 shown at 8 o'clock, and arm 62' is set at 12 o'clock. With these setting made, the centrifuge is started up and after the desired separation of fractions has been achieved as judged by experience, power is supplied to lead 84 and control box 56 starts motor 55 which rotates container-holder 47 in a counter-clockwise direction. Arm 61 is carried along and when lug 67' moves switch operator 69', switch control 60' actuates control box 56 to cut-off power to motor 55 in the same manner that photoelectric cell 80 does in the earlier described modification with container-holder 47 in the position shown in FIGURE 6. This is the point at which port 87 is still in the plasma but approaching the interface between the plasma and the heavier fraction. Of course, hereagain, if the plasma is unimportant and a tight red cell pack is desired, port 87 may be in such a position at this time as to let all the plasma fraction, the buffy layer and some red cells pass over into compartment 22.

As in the earlier described modification, alerted by a squealer light, the operator opens and then closes power circuit 84 thereby starting up motor 55 in the reverse direction. Container-holder 47 then turns in a clockwise direction until lug 68' of arm 62' moves switch operator 69' to the left. The impulse sent to control box 56 is the same as that previously sent in the earlier modification by limit switch 92. The centrifuge is then stopped with container-holder 47 in the position shown in FIGURE 7 and the container-holder is oscillated or moved in any desired manner to mix the treating liquid and the heavier fraction. While the centrifuge is stopped arm 61' is released and moved around to a new predetermined position, indicated in broken lines as being at 4 o'clock. The centrifuge is again started up to separate the treated heavier fraction and the effluent treating liquid evolved in the treating step.

When a satisfactory separation has been effected the operator opens and then closes power circuit 84 and control box 56 starts motor 55 in the reverse direction to rotate container 47 counterclockwise, engagement of lug 67' of arm 61' with switch operator 69' stopping motor 55 in the same manner as photoelectric cell 85 stops the motor in the position shown in FIGURE 8 of the earlier described modification. The position of arm 61' has been chosen so that port 88 has transferred effluent treating solution to compartment 23, leaving only treated heavy fraction in the main compartment 21. This completes the cycle.

Figure 11:
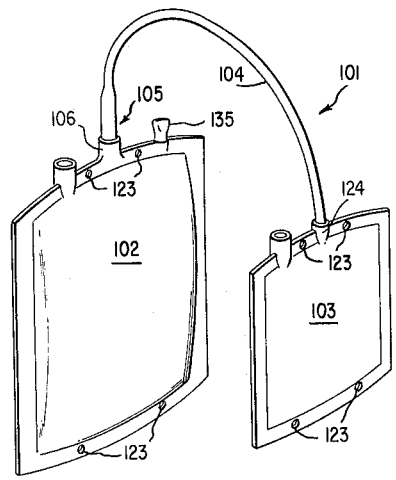
FIGURE 11 is a perspective view of a plural compartment container for use in a modified system in accordance with the present invention.

Referring to the modification illustrated in FIGURES 11–15 inclusive, FIGURE 11 shows a two-compartment blood bag 101 made up of main compartment 102 and a second compartment 103 interconnected by an integral tubing 104. Bag 101 can be conventional except for the provision of a valve construction indicated generally at 105 contiguous to its outlet port 106.

Figure 12:
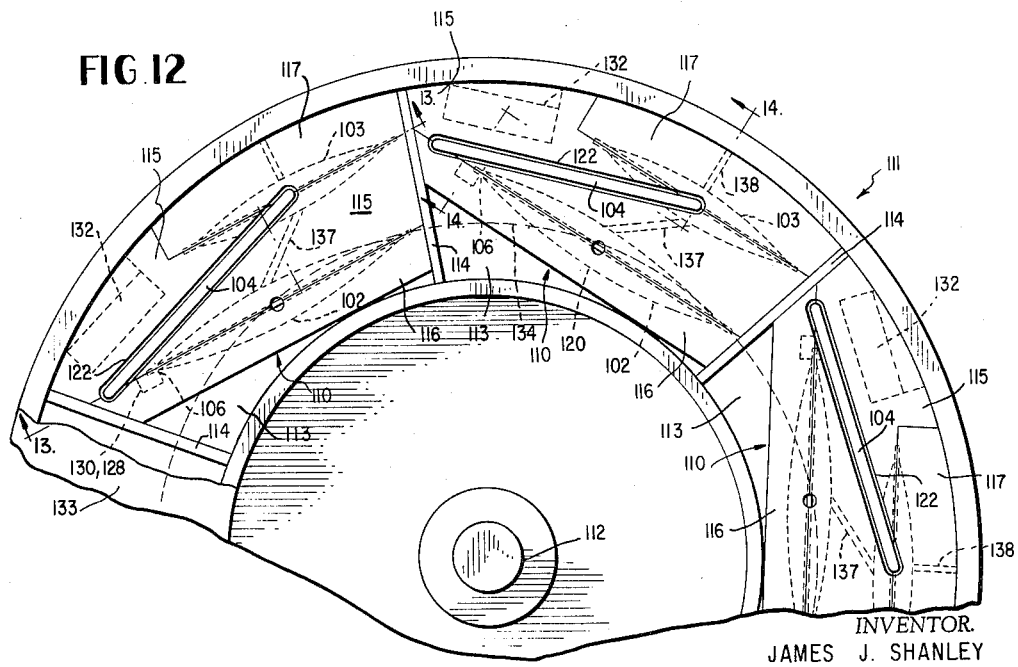
FIGURE 12 is a fragmentary plan view of a modification of the centrifuge system of the present invention.
Figure 13:
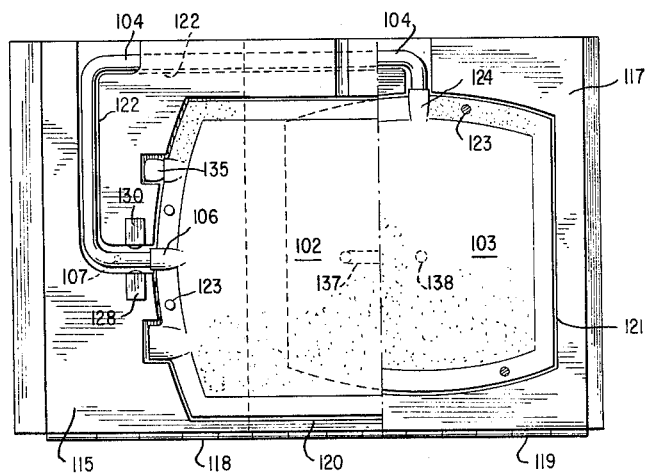
FIGURE 13 is a view in cross section on the line 13—13 of FIGURE 12.
Figure 14:
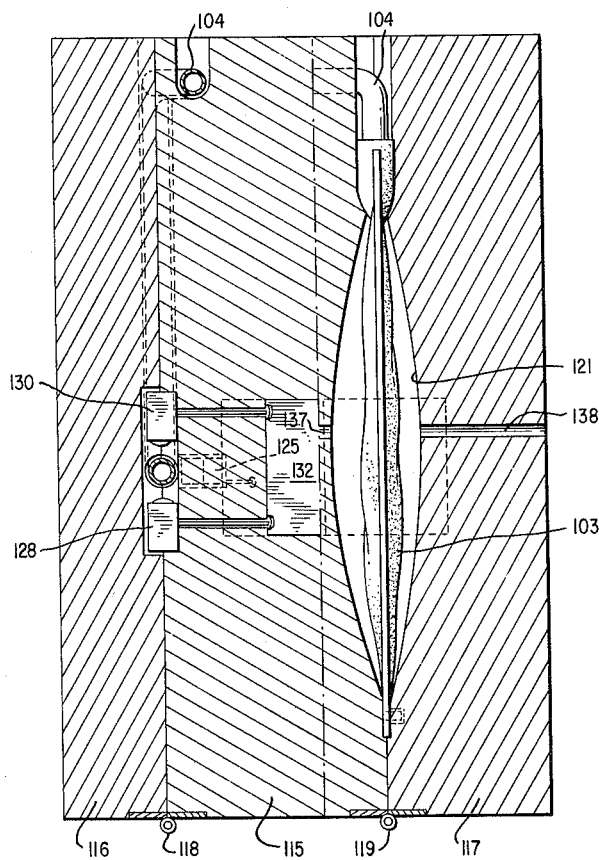
FIGURE 14 is a view in cross section taken on the line 14—14 of FIGURE 13.

A plurality of bags 101 are held in separate container-holders indicated generally at 110 which are in turn held in the rotor member 111 of a centrifuge shown schematically in FIGURE 12. The rotor 111 is carried on rotor spindle 112 and includes a liquid-impervious circular trough divided into wells 113 by substantially radial walls 114. The volumetric capacity of main compartment 102 of container 101 is such that the amount of liquid mixture to be fractionated fills main compartment 102 only to such an extent that the filled compartment can assume a flat configuration as shown in FIGURES 11 and 12, when constrained, as will be described. Each container-holder 110 is hollow to present an internal cavity 120 which holds each full main compartment in the centrifuge rotor member in such a position and in such a shape, as shown in FIGURE 12, that the wall of compartment 102 farthest from the axis of revolution has one end lying on a circle concentric to the axis of revolution and the other end, which carries outlet port 106, lying on a larger concentric circle. At the same time the greatest length and width dimensions of compartment 102 lie in a plane which is substantially vertical and normal to a line contiguous to a line radial to the axis of revolution. The second compartment 103 lies outside the interior of main compartment 102 relative to the axis of rotation.

Each container-holder is made up of three parts 115, 116 and 117 hinged together with hinges at 118 and 119. Main compartment 102 is held in cavity 120 formed between sections 115 and 116 and compartment 103 is held in a cavity 121 formed between sections 115 and 117 with tubing 104 accommodated by a groove 122. Holes 123 in the margins of the vessels 102 and 103 coact with protuberances (not shown) in container-holder 110 as in the previous embodiments so as to hold the vessels in predetermined and fixed position during centrifuging. The shapes of cavities 120 and 121 are substantially those which vessels 102 and 103 would assume when filled with liquid and suspended in a body of liquid of the same specific gravity as the liquid they contain.

Figure 15:
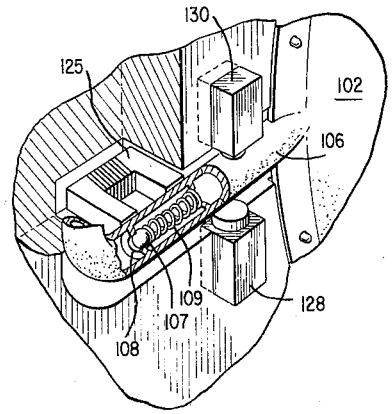
FIGURE 15 is an enlarged fragmentary perspective view with parts broken away illustrating an important feature of this modification.

FIGURE 15 shows a section through valve 105 which closes outlet port 106 of bag 102 through the medium of a ball 107 urged into sealing engagement with a valve seat 108 by compression spring 109.

Carried by container-holder section 115 are the components of a control system for actuating valve 105 at the desired point in the operation of the device. This control system comprises electromagnet 125 positioned adjacent valve 105 so that energization of the magnet with a current of electricity will move the magnetic ball 107 off valve seat 108 and thus open the valve. Contiguous to outlet port 106 of main compartment 102 is an electric light source 128 and a photoelectric cell 130. A control box is shown at 132 with the necessary electrical leads to the electromagnet, the electric light source and the photoelectric cell. Included in each control box is a battery, a centrifugal force actuated switch, an electrical timer and the necessary relays and amplifying devices for carrying out a simple sequence of operations to be described.

Passages 137, 138 and 139 permit ready flow of water or cushioning liquid during centrifuging as will be understood better from the description below. As in all modifications, ready flow of water is permitted to facilitate movement of the liquid fractions and to reduce pressure differences and prevent rupture of the vessels.

In a blood handling operation, blood is collected from the donor in main compartment 102, the blood inlet tube 135 being then sealed off and severed. The two compartment bag is then placed in container-holder 110 and the container-holder placed in one of the recesses in the rotor 111 with outlet port 106 at the side and end farthest from the axis of revolution and with inlet port 124 of compartment 103 at the top. Either the containers and container-holders are placed in all the recesses 123 or two or four container-holders must be arranged in balanced relation. Each well 113 is then filled with water to displace all air from cavities 120 and 121 and a watertight cover 133 secured in place.

On starting up the centrifuge, centrifugal force actuates the starting switch in control box 132 to initiate action of the electrical timer which is preset to give the optimum period of centrifuging time for accomplishing satisfactory separation of the fractions. The interface between the fractions will coincide with a curved plane concentric to the axis of revolution, such as indicated by the broken line 134. The shallow depth of the body of liquid mixture being fractionated reduces the time necessary for the separation. When the desired time for centrifuging has elapsed the timer acts to apply battery power across the electromagnetic and to the electric light source and the photoelectric cell circuit. Valve 107 immediately opens when the electromagnet is energized and since outlet port 106 is in the red cell fraction this heavier fraction will be transferred by centrifugal force through tube 104 and into compartment 103. As the heavier fraction leaves main compartment 102, the wall thereof closest to the axis of revolution collapses and the interface between the two fractions moves outwardly. Water in cavity 121 moves into the space left by the collapsing wall through the openings formed between the hinged sections of container-holder 110. As in all the containers of the present invention, the surfaces in contact with the blood have non-wetting characteristics relative to the blood constituents and therefore red cells do not adhere to the wall of compartment 102 as the interface between fractions moves along the rear wall relative to the axis of revolution. It will be apparent that because of the shape and position of compartment 102 the interface between the fractions will become smaller and smaller in area as the last portion of heavier fraction in the compartment approaches the outlet port 106 and the last such portion will leave through the port before any lighter fraction arrives there. The instant a less opaque or more translucent liquid enters port 106, the degree depending upon the setting of the photoelectric cell circuit, the entire light beam is no longer intercepted and photoelectric cell 130 acting through control box 132 cuts off electrical power to electromagnet 125. Valve 107 immediately closes by action of spring 109. The setting of the photoelectric cell circuit can be such that either the buffy layer or red cell fraction actuates the electromagnet to close the valve.

At this time the centrifuge can be shut down with the segregation of fractions accomplished. On the other hand if it is desired to separate platelets, these constituents having been permitted to go over into compartment 103, further centrifuging will separate a platelet pack on the rear wall of compartment 103 relative to the axis of revolution.

Figure 18:
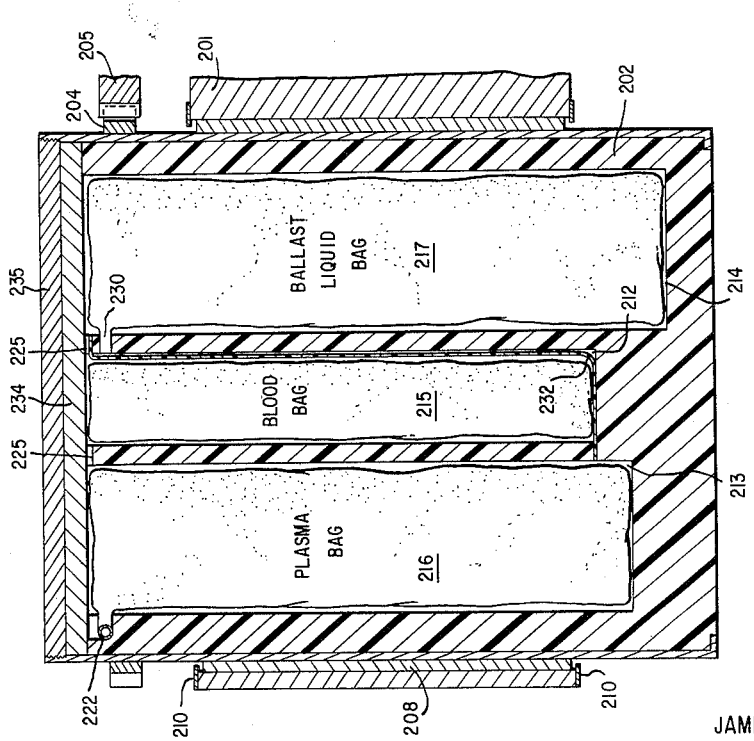
FIGURE 18 is a view in cross section on the line 18—18 of FIGURE 17.
Figure 16:
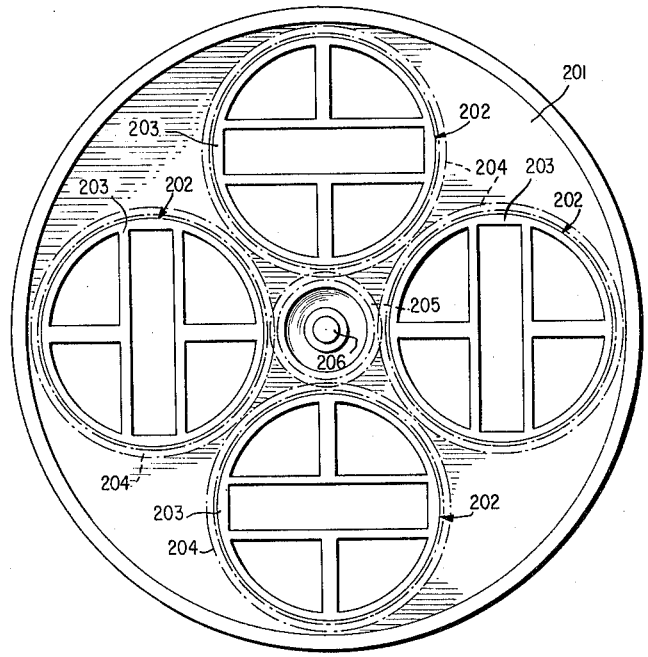
FIGURE 16 is a diagrammatic plan view of a further modified form of centrifuge system in accordance with the present invention.
Figure 17:
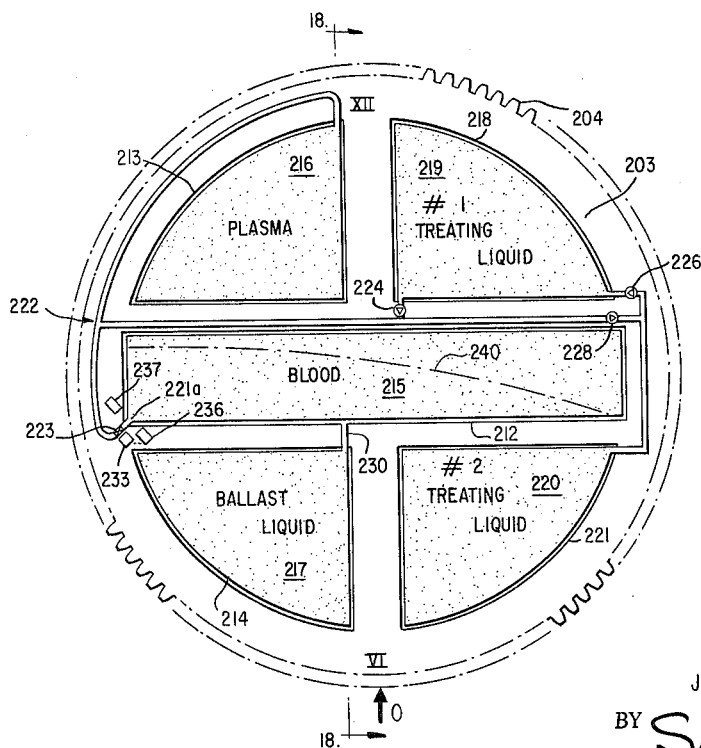
FIGURE 17 is an enlarged fragmentary plan view of a portion of FIGURE 16.

Referring now to the modification illustrated in FIGURES 16 to 18 inclusive, an embodiment is illustrated which by means of a flexible walled main compartment and any suitable squeezing means for this vessel makes possible a segregation of the lighter fraction and the heavier fraction with the heavier fraction held in the main compartment. If desired this can be achieved while maintaining the advantages of the simple arrangement of the modification of FIGURES 11 to 15 inclusive. Also illustrated by these figures is an embodiment which makes possible separation and segregation of the fractions and subsequent treatment of the heavier fraction with two different treating liquids. In view of the foregoing detailed disclosure, the modification of FIGURES 16 to 18 inclusive is illustrated schematically with as little detail as possible.

In the illustrated embodiment the squeezing means is a ballast liquid but where this resulting weight is objectionable gas under pressure or electromagnetic means can be used to carry out the method.

In FIGURE 16 there is shown a centrifuge system having a rotor table 201 with four wells 202 which are shown identical in shape and size. Received by each well is a container-holder 203 having a ring gear 204 which meshes with a pinion 205 surrounding and rotatably mounted relative to the spindle 206 of the centrifuge. Of course rotor table 201 is rigidly connected to spindle 206 while pinion gear 205 rotates relative to spindle 206, rotation of spindle 206 being controlled through a shaft passing down through a central opening in spindle 206 in any desired manner.

Referring to FIGURES 17 and 18, each container-holder 202 is rotatably received in centrifuge table 201 and includes a bearing member 208 which reduces friction and acts in conjunction with centrifuge table retainers 210 to maintain the parts in operative position. Each container-holder has a cavity 212 for receiving main vessel 215 of a plural compartment container similar to that illustrated in the modification of FIGURES 1 to 5 inclusive. There are also present in each container-holder 202 four additional cavities. Cavity 213 is for a plasma vessel or compartment 216 and cavity 214 is for a ballast liquid vessel or compartment 217. Cavities 218 and 221 are for treating liquid vessels or compartments 219 and 220, respectively. In FIGURE 18 the main compartment 215 is shown in place as are also plasma bag 216 and ballast liquid bag 217. Treating liquid vessels 219 and 220 are schematically illustrated in FIGURE 17 in place in the container-holder and in the centrifuge. A tubing network which may be filled with an inert gas is shown connecting the tops of the main compartment, the plasma compartment, the first treating liquid compartment and the second treating liquid compartment. This tubing network is indicated generally at 222 and includes a check valve at 224 that permits liquid flow only out of the first treating liquid compartment 219, check valve 226 which permits liquid flow only into the same compartment and check valve 228 which permits liquid flow only toward the right in FIGURE 17.

Ballast liquid vessel 217 forms part of the centrifuge and preferably has a volumetric capacity slightly greater than one-half the capacity of vessel 215. At its inner end this vessel empties through port 230 into the space between the nearest wall of cavity 212 and a flexible diaphragm 232 which is sealed to the top and bottom of cavity 212 and to the two left hand vertical corners as illustrated in FIGURE 18 and to the two top corners of cavity 212 to form a movable wall which when moved by the pressure of ballast liquid can diminish the volumetric capacity of main compartment 215 by more than one-half. The ballast liquid is a liquid, such as a brine solution, which is slightly heavier than the heaviest of blood or the treating liquid, if that is heavier.

The container made up of main compartment 215, plasma compartment 216, first treating liquid compartment 219 and second treating liquid compartment 220 is all integral and can be marketed with the treating liquids present.

Container-holder 202 is closed by a watertight inner cover 234 and an outer cover 235. Inner cover 234 includes grooves which properly position the tubing network, as described in connection with FIGURES 1–5 inclusive.

Container-holder 202 carries an electromagnetic valve operator means embedded in the material of the container-holder, in a manner similar to that illustrated in the modification of FIGURES 11 to 15 inclusive. This means includes electromagnet 233 for operating valve 223 and an electric light source 236 and photoelectric cell 237. The beam from the light source passes through outlet port 221 of main compartment 215, just as in the previously described modifications and as in the previously described modifications the positioning of the electric light source and the photo-electric cell can be designed so as to determine at what point segregation of the separated fractions will be made i.e. whether plasma only, plasma and platelet rich layer, plasma and buffy layer of plasma and some of the red cell pack will be transferred to compartment 216.

In order to facilitate description of the operation of this modification the numerals 6 and 12 of a clock face have been superimposed on FIGURE 17 and an arrow head at six o'clock in FIGURE 17 represents the direction of centrifugal force. Thus the showing in FIGURE 17 corresponds to the container-holder in the uppermost position in the schematic plan view of the centrifuge 201 of FIGURE 16.

With compartment 215 full of whole blood and with compartments 219 and 220 each full of the same or different treating liquids and with compartment 216 empty, the multi-compartment container is placed in container-holder 203 wherein the flexible vessel of compartment 215 assumes the shape shown in FIGURES 17 and 18. The other compartments may be of any desired shape, the quadrant shapes shown being merely for convenience in illustrating the invention. As in the previous modifications, the outlet port 221 of compartment 215 is accurately positioned relative to the photoelectric cell 237 and light source 236. The empty spaces in the cavities may be filled with water or any liquid lighter than the liquid mixture being centrifuged, the water being free to flow from compartment to compartment through spaces 225 between the cavity partitions and the inner cover. The tubing network is arranged in the grooves of inner cover 234. Outer cover 235 is applied and sealed to hold the water in during centrifuging.

Since all four container-holders revolve synchronously on revolution of pinon gear 205, the operator can exactly tell the angular position of each container-holder by means of the position of the shaft which turns gear 205. An electric power source (not shown) supplies electric energy to the electric light 236, photoelectric cell 237 and electromagnet 234 through the medium of a control box (not shown), all as in the preceding modifications. The switch connecting this power source to the control box is open when centrifuging is initiated.

The centrifuge is started with each container-holder in the position shown in FIGURE 17 relative to the axis of revolution. Thereupon ballast liquid from compartment 217 starts to enter compartment 215 but since this compartment is full there is little flow of ballast liquid. When a good separation of fractions has been achieved container-holder 203 is rotated by the operator in a counterclockwise direction until arrow 0 points at about seven o'clock. This positions interface 240 between fractions in the position shown in FIGURE 17. The switch is closed supplying electric energy to the control box which in turn lights the lamp 236 and energizes the electromagnet 233. Magnetic valve 223 opens and due to the pressure of the ballast liquid entering through port 230 into compartment 212, lighter fraction is transferred from compartment 215 to compartment 216. The photoelectric cell acts to cut-off power to the electromagnet when the predetermined decrease in the intensity of the light beam is caused by turbidity or opacity of the fraction entering port 221. If separation of a platelet pack is desired centrifuging is continued to separate a platelet pack on a wall of compartment 216.

It will be noted that if this cycle of operations is all that is desired of this device each container-holder 203 can be in permanent fixed position with the arrow 0 pointing at about seven o'clock. In such case when the segregated fractions are removed and a new container-holder inserted, forcible insertion of new compartment 215 will cause ballast liquid in space 212 to be transferred back into ballast compartment 217. The cycle can then be repeated.

Where it is desired to wash or treat the red cell pack or heavier fraction remaining in compartment 215, pinion gear 205 is actuated by the operator to rotate container-holder 203 in a counterclockwise direction to bring the twelve o'clock position in line with the arrow 0. Since this operation takes place while the centrifuge is still revolving the ballast liquid returns to compartment 217 and the treating liquid in compartment 219 is transferred by centrifugal force past check valve 224 and past magnetic valve 223 and into compartment 215 to mix with the heavier fraction there. The spring of magnetic valve 223 permits the treating liquid to pass and displace the water or other light liquid or the valve may be held open electromatically. As in the previous modification the treating liquid and heavier fraction are thoroughly mixed together in any desirable manner. With the centrifuge again up to speed gear 205 is actuated by the operator to rotate container-holder 203 clockwise back to the original position with six o'clock in alignment with the arrow 0. High speed centrifugation in this position separates the heavy fraction from the treating solution. While this is going on, centrifugal force transfers treating liquid from compartment 220 past check valve 226 into compartment 219. When a satisfactory separation has been achieved, as determined by time and experience, gear 205 is actuated by the operator to rotate container-holder 203 in a counterclockwise position to bring the seven o'clock position in alignment with arrow 0. As before the electric power source switch is closed and the automatic sequence of operations resulting permits ballast liquid to displace the first treating liquid from compartment 215 until the photoelectric cell circuit closes valve 223. The displaced treating liquid flows through the tubing network 222, past check valve 228 and into empty treating liquid compartment 220. Gear 205 is then again actuated by the operator to rotate container 203 conterclockwise to bring the twelve o'clock position back into alignment with arrow 0. This results in transfer of the second treating solution now in compartment 219 past check valve 224 and through tubing network 222 past spring closed magnetic valve 223 into main compartment 215 to mix with the heavier fraction there. The mixing of this treating solution and heavier fraction can be carried out as with the prior treating solution. The sequence of operation is then repeated whereby this second treating solution is separated by centrifugal force from the treated heavy fraction, together with any removed substances, followed by use of the ballast liquid to force the treating liquid effluent past electromagnetically opened valve 223 and check valve 224 into compartment 219.

The plural compartment container can then be removed from the centrifuge, compartments 219 and 220 separated therefrom for recovery of removed constituents and compartments 215 and 216 stored together or separated as desired. Of course in all cases of separation the tubing is sealed shut at two spaced points and severed in-between so as to maintain the liquids in the compartments against contamination.

If desired, after the heavier fraction is treated with the first treating liquid and the effluent of this step transferred to compartment 220, compartments 215 and 216 and compartment 219 which contains the second treating solution may be frozen and stored. In such case, on removal from storage the container would be placed in the centrifuge and the second treating solution mixed with the heavier fraction and then separated by centrifugation and segregated as before when all the steps were carried out in sequence without storage in-between. With such a method, plasma compartment 216 and compartment 220 with the effluent of the first treating liquid step could be removed prior to freezing.

The treating solution in the modifications and variants described may be any desired washing solvent, preservative, antifreeze or other solution to be mixed with a blood fraction or fractions with or without later centrifugal separation in the apparatus or method. Examples are saline solution, glycerol solution, deglycerolizing solution, wash solution, all as described in New Principle of Closed System Centrifugation which appeared in Science, Oct. 26, 1956, vol. 124, No. 3226, pp. 792–797.

If brittleness of the plastic vessel is a problem during the freezing step, this step can be carried out within flat metallic casing or molds which would protect the plastic vessels while in the frozen state and at the same time make possible rapid abstraction of heat from the liquid to be frozen by virtue of the flat or shallow shape of the bodies of liquid being frozen.

It is to be understood that all the embodiments of the present invention may have rigid walls. This would necessitate the presence of gas pressure equalizing passages between the compartments as disclosed in copending application Serial No. 802,398 but would eliminate the need for the container-holders.

In this specification the term "liquid" is used to refer to fluent bodies such as true liquids but also embraces within this meaning apparent liquids such as the red cell pack separated in blood fractionation and other substantially colloidal sized particles of matter separable from liquids. The terms "revolve" and "revolution" are used herein to embrace both the turning of a body around an axis outside the body and the turning of a body about an axis passing through the body, while the terms "rotate" and "rotation" are used to designate only turning of a body around an axis passing through the body. Where the term "density" is used in respect to the liquids being handled, apparent density is included within the meaning of the term, since, as has been pointed out earlier, blood comprises solid particles suspended in colloidal plasma.

What is claimed is:

1. The method of separating liquid mixtures into fractions of greater density and lesser density in a centrifuge having an axis of revolution, comprising the steps of
   (a) collecting liquid mixture in a compartment in a centrifuge element,
   (b) revolving the centrifuge element around the axis of revolution for a period of time until a first fractional liquid body of more dense fraction is formed resting against a wall of the compartment remote from the axis of revolution and a second fractional liquid body of less dense fraction is formed supported by the first liquid body and between the first liquid body and the axis of revolution.
   (c) then while continuing to revolve the centrifuge element around the axis of revolution to maintain the fractions separated moving liquid fraction out of the compartment, and
   (d) utilizing change in intensity of a beam of radiant energy passing through moving liquid fraction caused by change in density of moving liquid fraction to stop flow of liquid fraction out of the compartment.

2. The method of separating liquid mixtures into fractions of greater density and lesser density in a centrifuge having an axis of revolution, comprising the steps of
  (a) providing a centrifuge element separate from the centrifuge having a main compartment containing a discrete body of liquid mixture and a second compartment, the compartments being interconnected by passageway means,
  (b) placing the centrifuge element in the centrifuge, with both compartments and passageway means disposed laterally of the axis of revolution,
  (c) revolving the centrifuge element around the axis of revolution for a period of time until a first fractional liquid body of more dense fraction is formed resting against a wall of the main compartment remote from the axis of revolution and a second fractional liquid body of less dense fraction is formed supported by the first fractional liquid body and between the first fractional liquid body and the axis of revolution,
  (d) then while continuing to revolve the centrifuge element around the axis of revolution to maintain the fractions separated moving liquid fraction out of the main compartment through the passageway means into the second compartment, and
  (e) utilizing change in density of a beam of radiant energy passing through moving liquid fraction caused by change in density of moving liquid fraction to stop flow of liquid fraction out of the main compartment.

3. The method set out in claim 2 in which the liquid fraction being moved in (d) is less dense fraction.

4. The method set out in claim 2 in which the liquid fraction being moved in (d) is more dense fraction.

5. The method set out in claim 2 in which the liquid fraction being moved in (d) is a fraction of density intermediate said less dense fraction and said more dense fraction.

6. The method of separating liquid mixtures into fractions of greater density and lesser density in a centrifuge having an axis of revolution, comprising the steps of
  (a) providing a centrifuge element separate from the centrifuge having a main compartment containing a discrete body of liquid mixture and a second compartment, the compartments being interconnected by passageway means,
  (b) placing the centrifuge element in the centrifuge, with both compartments and passageway means disposed laterally of the axis of revolution,
  (c) revolving the centrifuge element around the axis of revolution with the body of liquid mixture held in elongated cross sectional shape in each of two intersecting planes normal to one another with the line of intersection of the planes contiguous to a line radially disposed relative to the axis of revolution,
  (d) continuing to revolve the centrifuge element for a period of time until a first fractional liquid body of more dense fraction is formed resting against a wall of the main compartment remote from the axis of revolution and a second fractional liquid body of less dense fraction is formed supported by the first fractional liquid body and the axis of revolution,
  (e) then while continuing to revolve the centrifuge element around the axis of revolution to maintain the fractions separated utilizing hydrostatic pressure to move liquid fraction out of the main compartment through the passageway into the second compartment, and
  (f) utilizing change in intensity of a beam of radiant energy through moving liquid fraction caused by change in density of moving liquid fraction to stop flow of liquid fraction out of the main compartment.

7. The method of separating liquid mixtures into fractions of greater density and lesser density in a centrifuge having an axis of revolution, comprising the steps of
  (a) providing a centrifuge element separate from the centrifuge having a main compartment containing a discrete body of liquid mixture and a second compartment, the compartments being interconnected by passageway means,
  (b) placing the centrifuge element in the centrifuge, with both compartments and passageway means disposed laterally of the axis of revolution,
  (c) revolving the centrifuge element around the axis of revolution with the body of liquid mixture in the main compartment held in elongated cross sectional shape in each of two intersection planes normal to one another with the line of intersection of the planes contiguous to a line radially disposed relative to the axis of revolution,
  (d) continuing to revolve the centrifuge element around the axis of revolution for a period of time until a first fractional liquid body of more dense fraction is formed resting against a wall of the main compartment remote from the axis of revolution and a second fractional liquid body of less dense fraction is formed supported by the first fractional liquid body and between the first fractional liquid body and the axis of revolution,
  (e) then while continuing to revolve the centrifuge element around the axis of revolution to maintain the fractions separated changing the position of the main compartment relative to the axis of revolution so that the line of intersection of the planes moves angularly relative to said line radially disposed relative to the axis of revolution to reduce the area of the interface between the fractional liquid bodies.

8. The method of separating liquid mixtures into fractions of greater density and lesser density in a centrifuge having an axis of revolution, comprising the steps of
  (a) providing a centrifuge element separate from the centrifuge having a main compartment containing a discrete body of liquid mixture and a second compartment, the compartments being interconnected by passageway means, including an outlet from the main compartment,
  (b) placing the centrifuge element in the centrifuge, with both compartments and passageway means disposed laterally of the axis of revolution,
  (c) revolving the centrifuge element around the axis of revolution with the body of liquid mixture in the main compartment held in elongated cross sectional shape in each of two intersecting planes normal to one another with the line of intersection of the planes contiguous to a line radially disposed relative to the axis of revolution,
  (d) continuing to revolve the centrifuge element around the axis of revolution for a period of time until a first fractional liquid body of more dense fraction is formed resting against a wall of the main compartment remote from the axis of revolution and a second fractional liquid body of less dense fraction is formed supported by the first fractional liquid body and between the first fractional liquid body and the axis of revolution,
  (e) then while continuing to revolve the centrifuge element to maintain the fractions separated changing the position of the main compartment to position the main compartment outlet at a point in the body of liquid mixture,
  (f) utilizing hydrostatic pressure to move liquid fraction out of the main compartment through the main compartment outlet, and
  (g) continuing to change the position of the main compartment to move the line of intersection of the planes angularly relative to said line radially disposed relative to the axis of revolution to reduce the area of the interface between fractional liquid bodies to a minimum at the time the last portion of the moving liquid fraction leaves the main compartment.

9. The method claimed in claim 8 in which a change in intensity of a beam of radiant energy passing through moving liquid fraction due to change in density of moving liquid fraction is utilized to stop movement of the line of intersection to thereby stop flow of liquid fraction through the outlet of the main compartment.

10. The method of separating liquid mixtures into fractions of greater density and lesser density in a centrifuge having an axis of revolution, comprising the steps of
 (a) providing a centrifuge element separate from the centrifuge having a main compartment containing a discrete body of liquid mixture and a second compartment, with an outlet from the main compartment and an inlet to the second compartment interconnected by passageway means,
 (b) placing the centrifuge element in the centrifuge, with both compartments and passageway means disposed laterally of the axis of revolution,
 (c) revolving the centrifuge element around the axis of revolution with the body of liquid mixture held in elongated cross sectional shape in each of two intersecting planes normal to one another with the line of intersection of the planes contiguous to a line radially disposed relative to the axis of revolution,
 (d) continuing to revolve both compartments and the discrete body of liquid mixture for a period of time until a first fractional liquid body of more dense fraction is formed resting against a wall of the main compartment remote from the axis of revolution and a second fractional liquid body of less dense fraction is formed supported by the first fractional liquid body and between the first fractional liquid body and the axis of revolution,
 (e) then while continuing to revolve both compartments around the axis of revolution to maintain the fractions separated moving the outlet of the main compartment and the second fractional liquid body relative to one another to bring at least a portion of the second fractional liquid body closer to the axis of revolution than the outlet of the main compartment while maintaining at least a portion of the second compartment farther from the axis of revolution than the outlet of the main compartment and maintaining the inlet of the second compartment and the connecting passageway at least as far from the axis of revolution as the outlet of the main compartment, whereby centrifugal force transfers less dense fraction from the second fractional liquid body in the first compartment through the outlet of the main compartment and the connecting passageway means into the second compartment.

11. The method claimed in claim 10 in which a change in intensity of a beam of radiant energy passing through moving liquid fraction due to change in density of moving liquid fraction is utilized to stop movement of the outlet of the main compartment to thereby stop flow of liquid fraction through the outlet of the main compartment.

12. The method of separating liquid mixtures into fractions of greater density and lesser density in a centrifuge having an axis of revolution, comprising the steps of
 (a) providing a centrifuge element separate from the centrifuge having a main compartment containing a discrete body of liquid mixture, a second compartment and a third compartment containing a liquid fraction treating liquid, the compartments being interconnected by passageway means,
 (b) placing the centrifuge element in the centrifuge,
 (c) revolving the centrifuge element around the axis of revolution for a period of time until a first fractional liquid body of more dense fraction is formed resting against a wall of the main compartment remote from the axis of revolution and a second fractional liquid body of less dense fraction is formed supported by the first fractional liquid body and between the first fractional liquid body and the axis of revolution,
 (d) then while continuing to revolve the centrifuge element around the axis of revolution to maintain the fractions separated moving liquid fraction out of the main compartment through passageway means into the second compartment, and
 (e) transferring treating liquid from the third compartment to another of the compartments to mix with the liquid fraction therein.

13. A centrifuge system for separating liquid mixtures into fractions of greater density and lesser density comprising
 (a) a centrifuge member mounted for revolution around an axis of revolution,
 (b) a first compartment having an outlet port and a liquid holding portion,
 (c) a second compartment having an inlet port and a liquid holding portion,
 (d) means associated with the centrifuge member holding the first compartment for revolution around the axis of revolution,
 (e) passageway means connecting the outlet port of the first compartment and the inlet port of the second compartment,
 (f) the first compartment adjacent the outlet port, the outlet port and the passageway means forming a path for liquid fraction leaving the first compartment,
 (g) a radiant energy sensitive means contiguous to the path,
 (h) a source of radiant energy arranged to direct radiant energy toward the radiant energy sensitive means,
 (i) the radiant energy sensitive means and the source of radiant energy being arranged so that liquid fraction flowing along the path is interposed between the source and radiant energy sensitive means at a point along the path, and
 (j) means actuated by the radiant energy sensitive means in response to the density of liquid fraction flowing along the path for controlling flow of liquid fraction along the path.

14. A centrifuge system for separating liquid mixtures into fractions of greater density and lesser density comprising
 (a) a centrifuge member mounted for revolution around an axis of revolution,
 (b) a first compartment having an outlet port and a liquid holding portion,
 (c) a second compartment having an inlet port and a liquid holding portion,
 (d) means associated with the centrifuge member holding the first and second compartments for revolution around the axis of revolution,
 (e) a continuous passageway means connecting the outlet port of the first compartment and the inlet port of the second compartment,
 (f) the first compartment adjacent the outlet port, the outlet port and the passageway means forming a path for liquid fraction leaving the first compartment,
 (g) a radiant energy sensitive means contiguous to the path,
 (h) a source of radiant energy arranged to direct radiant energy toward the radiant energy sensitive means,
 (i) the radiant energy sensitive means and source of radiant energy being arranged so that liquid fraction flowing through the path is interposed between the source and radiant energy sensitive means at a point along the path, and (j) means actuated by the radiant energy sensitive means for controlling flow of liquid fraction along the path.

15. A centrifuge system for separating liquid mixtures into fractions of greater density and lesser density comprising (a) a centrifuge member mounted for revolution around an axis of revolution, (b) a first compartment having an outlet port and a liquid holding portion, (c) a second compartment having an inlet port and a liquid holding portion, (d) means associated with the centrifuge member holding the first and second compartments for revolution around the axis of revolution, (e) a continuous passageway means connecting the outlet port of the first compartment and the inlet port of the second compartment, (f) the first compartment adjacent the outlet port, the outlet port and the passageway means forming a path for liquid fraction leaving the first compartment, (g) a radiant energy sensitive means contiguous to the path, (h) a source of radiant energy arranged to direct radiant energy toward the radiant energy sensitive means, (i) the radiant energy sensitive means and source of radiant energy being arranged so that liquid fraction flowing through the path is interposed between the source and radiant energy sensitive means at a point along the path, (j) a valve closing the path, (k) means for opening the valve, and (l) means actuated by the radiant energy sensitive means for closing the valve in response to the radiant energy transmission characteristics of liquid fraction in the path.

16. A centrifuge system for separating liquid mixtures into fractions of greater density and lesser density comprising (a) a centrifuge member mounted for revolution around an axis of revolution, (b) a compartment having a liquid holding portion shaped to hold a body of liquid of elongated cross sectional shape in each of two intersecting planes normal to one another with a line of intersection between them, (c) means associated with the centrifuge member holding the compartment with the line of intersection contiguous to a line radially disposed relative to the axis of revolution, (d) and means for moving the compartment relative to the centrifuge member to change the angle of the line of intersection relative to the radially disposed line.

17. A centrifuge system for separating liquid mixtures into fractions of greater density and lesser density comprising (a) a centrifuge member mounted for revolution around an axis of revolution, (b) a first compartment having an outlet port and a liquid holding portion, (c) a second compartment having an inlet port and a liquid holding portion, (d) means associated with the centrifuge member holding the first and second compartments with the outlet port of the first compartment closer to the axis of revolution than the liquid holding portion of the first compartment, (e) a continuous passageway means connecting the outlet port of the first compartment and the inlet port of the second compartment, (f) means associated with the centrifuge member for moving the first compartment relative to the centrifuge member while the centrifuge member is revolving around the axis of revolution to position the outlet port farther from the axis of revolution than a portion of the liquid holding portion of the first compartment, and (g) means associated with the centrifuge member for maintaining the inlet port and connecting passageway means at least as far away from the axis of revolution as the outlet port during the terminal portion of the movement of the first compartment relative to the centrifuge member.

18. Apparatus as claimed in claim 17 in which (a) the first compartment adjacent the outlet port, the outlet port and the passageway means form a path for liquid fraction leaving the first compartment, (b) a radiant energy sensitive means is contiguous to the path, (c) a source of radiant energy is arranged to direct radiant energy toward the radiant energy sensitive means, (d) the radiant energy sensitive means and source of radiant energy is arranged so that liquid fraction flowing through the path is interposed between the source and radiant energy sensitive means at a point along the path, and (e) there is means actuated by the radiant energy sensitive means for controlling flow of liquid fraction along the path.

19. A centrifuge system for separating liquid mixtures into fractions of greater density and lesser density comprising, (a) a centrifuge member mounted for revolution around an axis of revolution, (b) a first compartment having a liquid holding portion with width and length dimensions each several times greater than the thickness dimension of the liquid holding portion and having an outlet port, (c) a second compartment having an inlet port, (d) means associated with the centrifuge member holding the first and second compartments with the outlet port of the first compartment closer to the axis of revolution than the liquid holding portion of the first compartment and the thickness dimension substantially normal to the axis of revolution, (e) a continuous passageway means connecting the outlet port of the first compartment and the inlet port of the second compartment, (f) means associated with the centrifuge member for revolving the first compartment around an axis passing through the centrifuge member and noncoincident with the axis of revolution while the centrifuge element is revolving around the axis of revolution to position the outlet port farther from the axis of revolution than a portion of the liquid holding portion of the first compartment and to position the liquid holding portion of the first compartment with the thickness dimension thereof at an angle to the initial position of the thickness dimension of the first compartment, which angle is not greater than 90°, and (g) means associated with the centrifuge member for maintaining the inlet port and connecting passageway means at least as far away from the axis of revolution as the outlet port during terminal portion of the movement of the first compartment relative to the centrifuge member.

20. A centrifuge system for separating liquid mixtures into fractions of greater density and lesser density comprising (a) a centrifuge member mounted for revolution around an axis of revolution, (b) a first compartment having an outlet port, a liquid holding portion and a flexible wall portion in the liquid holding portion,
(c) a second compartment having an inlet port and a liquid holding portion,
(d) means associated with the centrifuge member holding the first and second compartments for revolution around the axis of revolution,
(e) a continuous passageway means connecting the outlet port of the first compartment and the inlet port of the second compartment,
(f) the first compartment adjacent the outlet port, the outlet port and the passageway means forming a path for liquid fraction leaving the first compartment,
(g) means associated with the centrifuge member for exerting pressure on the flexible wall portion during centrifuging to reduce the volumetric capacity of the liquid holding portion to move liquid fraction along the path,
(h) a radiant energy sensitive means contiguous to the path,
(i) a source of radiant energy arranged to direct radiant energy toward the radiant energy sensitive means,
(j) the radiant energy sensitive means and source of radiant energy being arranged so that liquid fraction flowing through the path is interposed between the source of radiant energy and the radiant energy sensitive means at a point along the path, and
(k) means controlled by the radiant energy sensitive means stopping movement of liquid fraction along the path in response to radiant energy transmission characteristics of the liquid fraction in the path.

21. A centrifuge system for separating liquid mixtures into fractions of greater density and lesser density comprising
(a) a centrifuge member mounted for revolution around an axis of revolution,
(b) a first compartment having an outlet port, a liquid holding portion and a flexible wall portion in the liquid holding portion,
(c) a second compartment having an inlet port and a liquid holding portion,
(d) means associated with the centrifuge member holding the first and second compartments for revolution around the axis of revolution,
(e) a continuous passageway means connecting the outlet port of the first compartment and the inlet port of the second compartment,
(f) the first compartment adjacent the outlet port, the outlet port and the passageway means forming a path for liquid fraction leaving the first compartment,
(g) means associated with the centrifuge member for exerting pressure on the flexible wall portions during centrifuging to reduce the volumetric capacity of the liquid holding portion to move liquid fraction along the path,
(h) a radiant energy sensitive means contiguous to the path,
(i) a source of radiant energy arranged to direct radiand energy toward the radiant energy sensitive means,
(j) the radiant energy sensitive means and source of radiant energy being arranged so that liquid fraction flowing through the path is interposed between the source of radiant energy and the radiant energy sensitive means at a point along the path,
(k) a valve closing the path,
(l) means for opening the valve, and
(m) means actuated by the radiant energy sensitive means for closing the valve in response to the radiant energy transmission characteristics of the liquid fraction in the path.

22. A centrifuge system for separating liquid mixtures into fractions of greater density and lesser density comprising
(a) a centrifuge member mounted for revolution around an axis of revolution,
(b) a first compartment having an outlet port and a liquid holding portion,
(c) a second compartment having an inlet port and a liquid holding portion,
(d) a third compartment having a treating liquid holding portion and a treating port,
(e) means associated with the centrifuge member holding the three compartments for revolution around the axis of revolution,
(f) passageway means interconnecting the ports to place the liquid holding portions of the compartments in communication, and
(g) means for moving liquid fraction separated during centrifuging from the first compartment to the second compartment and treating liquid from the third compartment to another claimed compartment during revolution of the centrifuge member around the axis of revolution.

23. A package for collecting the centrifuging blood to fractionate the same, segregate the fractions and treat a fraction comprising
(a) a first sealed compartment containing anti-coagulant for collecting the whole blood prior to fractionation and segregation,
(b) a second sealed compartment for receiving and segregating plasma fraction from the fractionating step,
(c) a third sealed compartment containing blood fraction treating liquid,
(d) an outlet port in the first compartment,
(e) a treating port in the first compartment,
(f) an inlet port in the second compartment,
(g) a treating port in the third compartment,
(h) passageway means interconnecting the ports, and
(i) means closing the treating port.

24. The method of separating liquid mixtures into fractions of greater density and lesser density comprising the steps of:
(a) providing a centrifuge having a container receiving member revolvable around an axis of centrifugation,
(b) providing a container separate from the centrifuge having a first compartment with an outlet, the first compartment containing a discrete body of liquid mixture, and a second compartment having an inlet, the outlet and inlet being connected by a passageway means,
(c) placing the container in the container receiving member of the centrifuge, with both compartments held by the member for synchronous revolution around the axis of centrifugation, with the discrete body of liquid mixture confined to the first compartment and held by gravity with the discrete body liquid mixture below the outlet,
(d) revolving the container receiving member and both of the compartments synchronously around the axis of centrifugation for a period of time until the discrete body of liquid mixture forms within the first compartment a first fractional liquid body of more dense fraction resting against a wall of the first compartment remote from the axis of centrifugation and a second fractional liquid body of less dense fraction supported by the first fractional liquid body and between the first fractional liquid body and the axis of centrifugation with the outlet located between the axis of centrifugation and the second fractional liquid body,
(e) then while continuing to revolve the container around the axis of centrifugation causing relative movement of the outlet and the axis of centrifugation to bring the outlet into the second fractional liquid body while maintaining the passageway means and at least a portion of the second compartment not substantially nearer the axis of centrifugation than the outlet to initiate movement of less dense fraction out of the first compartment through the passageway means into the synchronously revolving second compartment, (f) terminating movement of liquid fraction out of the first compartment to retain at least part of the more dense fraction in the first compartment, and (g) collecting liquid fraction in the second compartment during centrifugation of the container and holding the collected liquid fraction within the second compartment on cessation of centrifugation.

25. Apparatus for separating liquid mixtures into fractions of greater density and lesser density comprising:

(a) a centrifuge having a container holding member which revolves around an axis of centrifugation, (b) a container having a first liquid holding compartment with means defining an outlet, a second liquid holding compartment with means defining an inlet and a liquid conducting passageway means interconnecting the outlet and the inlet, (c) means carried by the container holding member holding the first compartment, the second compartment and the passageway means for synchronous revolution around the axis of centrifugation, (d) means associated with the means claimed in (c) for releasing the container for separation of the container from the container holding member.

(e) means associated with the first compartment for holding and confining a discrete body of liquid mixture entirely within the first compartment during centrifuging, (f) wall means associated with the means claimed in (e) for holding the discrete body of liquid mixture during centrifuging to form a first fractional liquid body of more dense fraction held against a first portion of the wall means remote from the axis of centrifugation and a second fractional liquid body of less dense fraction supported by the first fractional liquid body and a second portion of the wall means between the first fractional liquid body and the axis of centrifugation, (g) means for moving the outlet and the axis of centrifugation relative to one another during centrifuging, while maintaining the passageway means and at least a portion of the second compartment not substantially nearer the axis of centrifugation than the outlet, to position the outlet in the second fractional liquid body whereby less dense fraction moves through the outlet, the passageway means and the inlet into the second compartment, (h) means causing a cessation of movement of liquid fraction through the passageway means when a predetermined flow of liquid has taken place, and (i) means associated with the second compartment for collecting liquid fraction during centrifuging and holding the collected liquid fraction on cessation of centrifuging.

26. In apparatus for separating liquid mixtures into fractions of greater density and lesser density in which a first compartment of a plural compartment container initially holds a discrete body of the liquid mixture to be fractionated in a liquid holding portion thereof and a passageway means connects an outlet opening in the first compartment with an inlet opening in a second compartment in the container, the combination comprising:

(a) a centrifuge member for revolution around an axis of revolution, (b) means associated with the centrifuge member for holding the first compartment, the second compartment and the passageway means of a said container for synchronous revolution around the axis of revolution, (c) means associated with the centrifuge member for holding the first compartment, the second compartment and the passageway means of the container against removal during centrifuging, (d) means associated with the centrifuge member for releasing the first compartment, the second compartment and the passageway means for removal from the centrifuge member when the centrifuge member is not being revolved, (e) means associated with the centrifuge member for positioning the liquid holding portion of the first compartment during centrifuging so that the discrete body of more dense fraction forms a first fractional liquid body held against a first wall portion of the first compartment remote from the axis of revolution and a second fractional liquid body of less dense fraction supported by the first fractional liquid body and a second wall portion of the first compartment, (f) rigid wall means associated with the means (e) for engaging and maintaining said first and second wall portions of the liquid holding portion of the first compartment of the container in predetermined shape against hydrostatic pressure in the discrete body of liquid mixture during centrifuging, (g) means associated with the means (f) for holding the portion of the first compartment adjacent the outlet, the outlet and the portion of the passageway means adjacent the outlet to form a fixed path relative to means (e) during centrifuging, (h) means associated with the rigid wall means (f) for positioning the outlet opening in one of the fractional liquid bodies after the first and second fractional liquid bodies have formed.

(i) a radiant energy sensitive means contiguous to the path of means (g), (j) a source of radiant energy arranged to direct a beam of radiant energy toward the radiant energy sensitive means and through the path of means (g), (k) means actuated by the radiant energy sensitive means in response to the density of liquid fraction flowing along the path for controlling flow of liquid fraction along the path.

27. In apparatus as claimed in claim 26 in which (a) the outlet opening is initially closed by a valve, (b) the means (h) includes means for opening the valve, and (c) the means (k) includes means for closing the valve in response to the radiant energy transmission characteristics of liquid fraction in the path.

28. In apparatus for separating liquid mixtures into fractions of greater density and lesser density in which a first compartment of a plural comparement container initially holds a discrete body of the liquid mixture to be fractionated in a liquid holding portion thereof and a passageway means connects an outlet opening in the first compartment with an inlet opening in a second compartment in the container, the combination comprising:

(a) a centrifuge member for revolution around an axis of revolution, (b) means associated with the centrifuge member for holding the first compartment, the second compartment and the passageway means of a said container for synchronous revolution around the axis of revolution, (c) mean associated with the centrifuge member for holding the first compartment, the second compartment and the passageway means of the container against removal during centrifuging, (d) means associated with the centrifuge member for releasing the first compartment, the second compartment and the passageway means for removal from the centrifuge member when the centrifuge member is not being revolved, (e) means associated with the centrifuge member for positioning the liquid holding portion of the first compartment during centrifuging so that the discrete body of more dense fraction forms a first fractional liquid body held against a first wall portion of the first compartment remote from the axis of revolution and a second fractional liquid body of less dense fraction supported by the first fractional liquid body and a second wall portion of the first compartment, (f) relatively rigid walls associated with the means (e) for engaging and maintaining said first and second wall portions against hydrostatic pressure so that the discrete body of liquid is constrained to an elongated cross sectional shape in each of two intersecting planes normal to one another with a line of intersection between them, (g) means associated iwth the centrifuge member holding the first compartment with the line of intersection contiguous to a line radially disposed relative to the axis of revolution, and (h) means for moving the first compartment relative to the centrifuge member to change the angle of the line of intersection relative to the radially disposed line.

29. In apparatus for separating liquid mixtures into fractions of greater density and lesser density in which a first compartment of a plural compartment container initially holds a discrete body of the liquid mixture to be fractionated in a liquid holding portion thereof and a passageway means connects an outlet opening in the first compartment with an inlet opening in a second compartment in the container, the combination comprising:

(a) a centrifuge member for revolution around an axis of revolution, (b) means associated with the centrifuge member for holding the first compartment, the second compartment and the passageway means of a said container for synchronous revolution around the axis of revolution, (c) means associated with the centrifuge member for holding the first compartment, the second compartment and the passageway means of the container against removal during centrifuging, (d) means associated with the centrifuge member for releasing the first compartment, the second compartment and the passageway means for removal from the centrifuge member when the centrifuge member is not being revolved, (e) means associated with the centrifuge member for positioning the liquid holding portion of the first compartment during centrifuging so that the discrete body of more dense fraction forms a first fractional liquid body held against a first wall portion of the first compartment remote from the axis of revolution and a second fractional liquid body of less dense fraction supported by the first fractional liquid body and a second wall portion of the first compartment, (f) means associated with the centrifuge member holding the first and second compartments with the outlet of the first compartment closer to the axis of revolution than the liquid holding portion of the first compartment, (g) means associated with the centrifuge member for moving the first compartment relative to the centrifuge member while the centrifuge member is revolving around the axis of revolution to position the outlet farther from the axis of revolution than a portion of the liquid holding portion of the first compartment, and (h) means associated with the centrifuge member for maintaining the inlet and connecting passageway means at least as far away from the axis of revolution as the outlet during the terminal portion of the movement of the first compartment relative to the centrifuge member.

30. In apparatus for separating liquid mixtures into fractions of greater density and lesser density in which a flexible walled first compartment of a plural compartment container initially holds a discrete body of the liquid mixture to be fractionated in a liquid holding portion thereof and a passageway means connects an outlet opening in the first compartment with an inlet opening in a second compartment in the container, the combination comprising:

(a) a centrifuge member for revolution around an axis of revolution, (b) means associated with the centrifuge member for holding the first compartment, the second compartment and the passageway means of a said container for synchronous revolution around the axis of revolution, (c) means associated with the centrifuge member for holding the first compartment, the second compartment and the passageway means of the centainer against removal during centrifuging, (d) means associated with the centrifuge member for releasing the first compartment, the second compartment and the passageway means for removal from the centrifuge member when the centrifuge member is not being revolved, (e) means associated with the centrifuge member for positioning the liquid holding portion of the first compartment during centrifuging so that the discrete body of more dense fraction forms a first fractional liquid body held against a first wall portion of the first compartment remote from the axis of revolution and a second fractional liquid body of less dense fraction supported by the first fractional liquid body and a second wall portion of the first compartment, (f) means associated with the means (e) for holding the portion of the first compartment adjacent the outlet, the outlet and the portion of the passageway means adjacent the outlet to form a fixed path relative to the first compartment during centrifuging, (g) means associated with the centrifuge member for exerting pressure on the flexible wall portion during centrifuging to reduce the volumetric capacity of the liquid holding portion to move liquid fraction along the path, (h) a radiant energy sensitive means contiguous to the path of means (f), (i) a source of radiant energy arranged to direct a beam of radiant energy toward the radiant energy sensitive means and through the path of means (f), (j) means actuated by the radiant energy sensitive means in response to the density of liquid fraction flowing along the path of means (f) for controlling flow of liquid fraction along the path.

31. In apparatus for separating liquid mixtures into fractions of greater density and lesser density in which a first compartment of a plural compartment container initially holds a discrete body of the liquid mixture to be fractionated in a liquid holding portion thereof, a passageway means connects an outlet opening in the first compartment with an inlet opening in a second compartment in the container, a third compartment initially holds liquid for treating a separated fraction and a second passageway means connects a treating port in the third compartment with the interior of one of the other compartments, the combination comprising:

(a) a centrifuge member for revolution around an axis of revolution, (b) means associated with the centrifuge member for holding the first compartment, the second compartment, the third compartment and both the passageway means of a said container for synchronous revolution around the axis of revolution, (c) means associated with the centrifuge member for holding the first compartment, the second compartment, the third compartment and both the passageway means of the container against removal during centrifuging, (d) means associated with the centrifuge member for releasing the first compartment, the second compartment, the third compartment and both the passageway means for removal from the centrifuge member when the centrifuge member is not be being revolved, (e) means associated with the centrifuge member for positioning the liquid holding portion of the first compartment during centrifuging so that the discrete body of more dense fraction forms a first fractional liquid body held against a first wall portion of the first compartment remote from the axis of revolution and a second fractional liquid body of less dense fraction supported by the first fractional liquid body and a second wall portion of the first compartment, (f) rigid wall means associated with the means (e) for engaging and maintaining said first and second wall portions of the liquid holding portion of the first compartment of the container in predetermined shape against hydrostatic pressure in the discrete body of liquid mixture during centrifuging, (g) means associated with the means (f) for holding the portion of the first compartment adjacent the outlet, the outlet and the portion of the passageway means adjacent the outlet to form a relatively fixed path during centrifuging, (h) means associated with the rigid wall means (f) for positioning the outlet opening in one of the fractional liquid bodies after the first and second fractional liquid bodies have formed, (i) means associated with the centrifuge member for positioning the third compartment and the treating port relative to the axis of revolution with treating liquid between the treating port and the axis of revolution, and (j) means associated with the centrifuge member causing treating liquid to flow through the second passage way means into one of the other compartments.

References Cited by the Examiner
UNITED STATES PATENTS

| | | | |
|---|---|---|---|
| 273,037 | 2/83 | Decastro et al. | 233—20 |
| 1,124,907 | 1/15 | Jahn | 233—20 |
| 1,132,814 | 3/15 | Weston et al. | 233—20 |
| 1,648,369 | 11/27 | Svedberg et al. | 233—26 |
| 2,135,839 | 11/38 | Persons | 233—25 X |
| 2,321,887 | 6/43 | Ayres | 233—20 |
| 2,431,142 | 11/47 | Schutte | 233—18 |
| 2,702,034 | 2/55 | Walter. | |
| 2,893,628 | 7/59 | Herman | 233—20 |
| 3,009,388 | 11/61 | Polanyi. | |
| 3,050,238 | 8/62 | Doyle et al. | 233—15 |
| 3,064,647 | 11/62 | Earl. | |
| 3,079,070 | 2/63 | Thylefors | 233—22 |
| 3,096,283 | 7/63 | Hein | 233—20 |
| 3,133,881 | 5/64 | Childs | 233—20 |

FOREIGN PATENTS 365,989   1/32   Great Britain.

OTHER REFERENCES

Raccuglia: "Disposable Container for Separation and Storage of Blood Components in a Sterile Closed System," Proceedings of the Seventh Congress of the International Society of Blood Transfusion, Rome, 1958.

M. CARY NELSON, *Primary Examiner.*

ROBERT F. BURNETT, *Examiner.*